US010514177B2

United States Patent
Hussain et al.

(10) Patent No.: US 10,514,177 B2
(45) Date of Patent: *Dec. 24, 2019

(54) SMARTVENT AND ATMOSPHERIC CONTROLLER APPARATUSES, METHODS AND SYSTEMS

(71) Applicant: ConnectM Technology Solutions, Inc., Marlborough, MA (US)

(72) Inventors: Nayeem M. Hussain, Union City, NJ (US); William J. McLeod, Hoboken, NJ (US); Ryan T. Fant, New York, NY (US); Theodore R. Ullrich, Brooklyn, NY (US); Dean DiPietro, Brooklyn, NY (US)

(73) Assignee: CONNECTM TECHNOLOGY SOLUTIONS, INC., Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,339

(22) Filed: Mar. 2, 2017

(65) Prior Publication Data

US 2017/0176034 A1    Jun. 22, 2017

Related U.S. Application Data

(63) Continuation of application No. 14/248,879, filed on Apr. 9, 2014, now Pat. No. 9,618,222.

(Continued)

(51) Int. Cl.
*F24F 11/62* (2018.01)
*F24F 11/30* (2018.01)
(Continued)

(52) U.S. Cl.
CPC ............ *F24F 11/62* (2018.01); *F24F 11/30* (2018.01); *G05B 19/048* (2013.01);
(Continued)

(58) Field of Classification Search
CPC ...................................................... F24F 11/62
(Continued)

(56) References Cited

U.S. PATENT DOCUMENTS

| 4,273,283 A | 6/1981 | Edwards |
| 5,164,641 A * | 11/1992 | Quibel ............... E01C 19/288 |
| | | 318/128 |

(Continued)

FOREIGN PATENT DOCUMENTS

WO    2010/078459 A1    7/2010

OTHER PUBLICATIONS

Palensky, Peter, and Dietmar Dietrich. "Demand side management: Demand response, intelligent energy systems, and smart loads." IEEE transactions on industrial informatics 7.3 (2011): pp. 381-388.*

(Continued)

*Primary Examiner* — Satish Rampuria
(74) *Attorney, Agent, or Firm* — Myers Wolin, LLC

(57) ABSTRACT

The SmartVent and Atmospheric Controller Apparatuses, Methods and Systems ("SmartVent") transforms user desired environmental setting and SmartVent measurement inputs via SmartVent components into SmartVent adjustment messages and environmental change outputs. In one embodiment, a SmartVent system may include a self-regulating HVAC system, comprising a plurality of smart HVAC vents disposed in wireless communication with a remote computing device. Where the remote computing device includes a memory and a processor disposed in communication with the memory, configured to record calibration data from each of said plurality of smart HVAC vents. The calibration data may include temperature and flow rate data from each of said plurality of smart HVAC vents. The system may generate calibration tables in accordance with (Continued)

the recorded calibration data and transmit instructions to each of the plurality of smart HVAC vents to optimize thermal conditions and energy efficiency of the HVAC system, in accordance with said calibration tables.

13 Claims, 18 Drawing Sheets

Related U.S. Application Data

(60) Provisional application No. 61/949,400, filed on Mar. 7, 2014, provisional application No. 61/810,236, filed on Apr. 9, 2013.

(51) Int. Cl.
| | |
|---|---|
| *G05B 19/048* | (2006.01) |
| *G05D 23/19* | (2006.01) |
| *F24F 11/58* | (2018.01) |
| *F24F 11/63* | (2018.01) |
| *F24F 110/10* | (2018.01) |
| *F24F 11/52* | (2018.01) |
| *F24F 130/10* | (2018.01) |
| *F24F 130/00* | (2018.01) |

(52) U.S. Cl.
CPC .......... *G05D 23/1917* (2013.01); *F24F 11/52* (2018.01); *F24F 11/58* (2018.01); *F24F 11/63* (2018.01); *F24F 2110/10* (2018.01); *F24F 2130/00* (2018.01); *F24F 2130/10* (2018.01); *G05B 2219/2614* (2013.01)

(58) Field of Classification Search
USPC .................................................. 700/275–285
See application file for complete search history.

(56) References Cited

U.S. PATENT DOCUMENTS

| | | | |
|---|---|---|---|
| 5,441,451 A | 8/1995 | Jeung | |
| 5,711,480 A | 1/1998 | Zepke et al. | |
| 6,692,349 B1 | 2/2004 | Brinkerhoff et al. | |
| 7,168,627 B2 | 1/2007 | Kates | |
| 8,550,370 B2 | 10/2013 | Barrett et al. | |
| 2004/0194484 A1 | 10/2004 | Mao et al. | |
| 2006/0117767 A1 | 6/2006 | Mowris | |
| 2008/0033599 A1 | 2/2008 | Aminpour et al. | |
| 2010/0262298 A1* | 10/2010 | Johnson | F24F 11/001 700/277 |
| 2010/0286830 A1 | 11/2010 | Wijaya et al. | |
| 2011/0077758 A1* | 3/2011 | Tran | A61B 5/1113 700/94 |
| 2011/0166712 A1* | 7/2011 | Kramer | G05D 23/1919 700/278 |
| 2012/0125558 A1 | 5/2012 | Nortman et al. | |
| 2012/0136490 A1* | 5/2012 | Weatherbee | G01B 7/003 700/282 |
| 2012/0203380 A1 | 8/2012 | Scelzi et al. | |
| 2013/0204439 A1 | 8/2013 | Scelzi | |
| 2015/0006129 A1 | 1/2015 | An et al. | |
| 2016/0127875 A1 | 5/2016 | Zampini, II | |

OTHER PUBLICATIONS

Wang, Lingfeng, Zhu Wang, and Rui Yang. "Intelligent multiagent control system for energy and comfort management in smart and sustainable buildings." IEEE transactions on smart grid 3.2 (2012): pp. 605-617.*
Wang, Zhu, Rui Yang, and Lingfeng Wang. "Multi-agent control system with intelligent optimization for smart and energy-efficient buildings." IECON 2010—36th Annual Conference on IEEE Industrial Electronics Society. IEEE, 2010.pp. 1144-1149.*
Snoonian, "Smart Buildings", IEEE Spectrum, pp. 18-23, Aug. 2003.
Ashrae, "Heating, Ventilating, and Air-Conditioning Systems and Equipment", 2004 Ashrae Handbook, HVAC Systems and Equipment, Inch-Pound Edition, pp. 1-10, Atlanta, GA (US), Jan. 2004.
Ivanov et al., "Distributed smart sensor system for indoor climate monitoring", 2002 KONNEX Scientific Conference, pp. 1-8, Munich, Germany, Oct. 10-11, 2002.
Agarwal et al., "Occupancy-Driven Energy Management for Smart Building Automation", Proceedings of the 2nd ACM Workshop on Embedded Sensing Systems for Energy-Efficiency in Building, BuildSys 2010, pp. 1-6, ACM, Zurich, Switzerland, Nov. 2, 2010.
Patel et al., "Detecting Human Movement by Differential Air Pressure Sensing in HVAC System Ductwork: An Exploration in Infrastructure Mediated Sensing", 2008 International Conference on Pervasive Computing, LNCS 5013, pp. 1-18, Springer-Verlag, Heidelberg, Berlin, 2008.
Jo et al., "Smart Heating and Air Conditioning Scheduling Method Incorporating Customer Convenience for Home Energy Management System", IEEE Transactions on Consumer Electronics, vol. 59, No. 2, pp. 316-322, IEEE, May 2013.

* cited by examiner

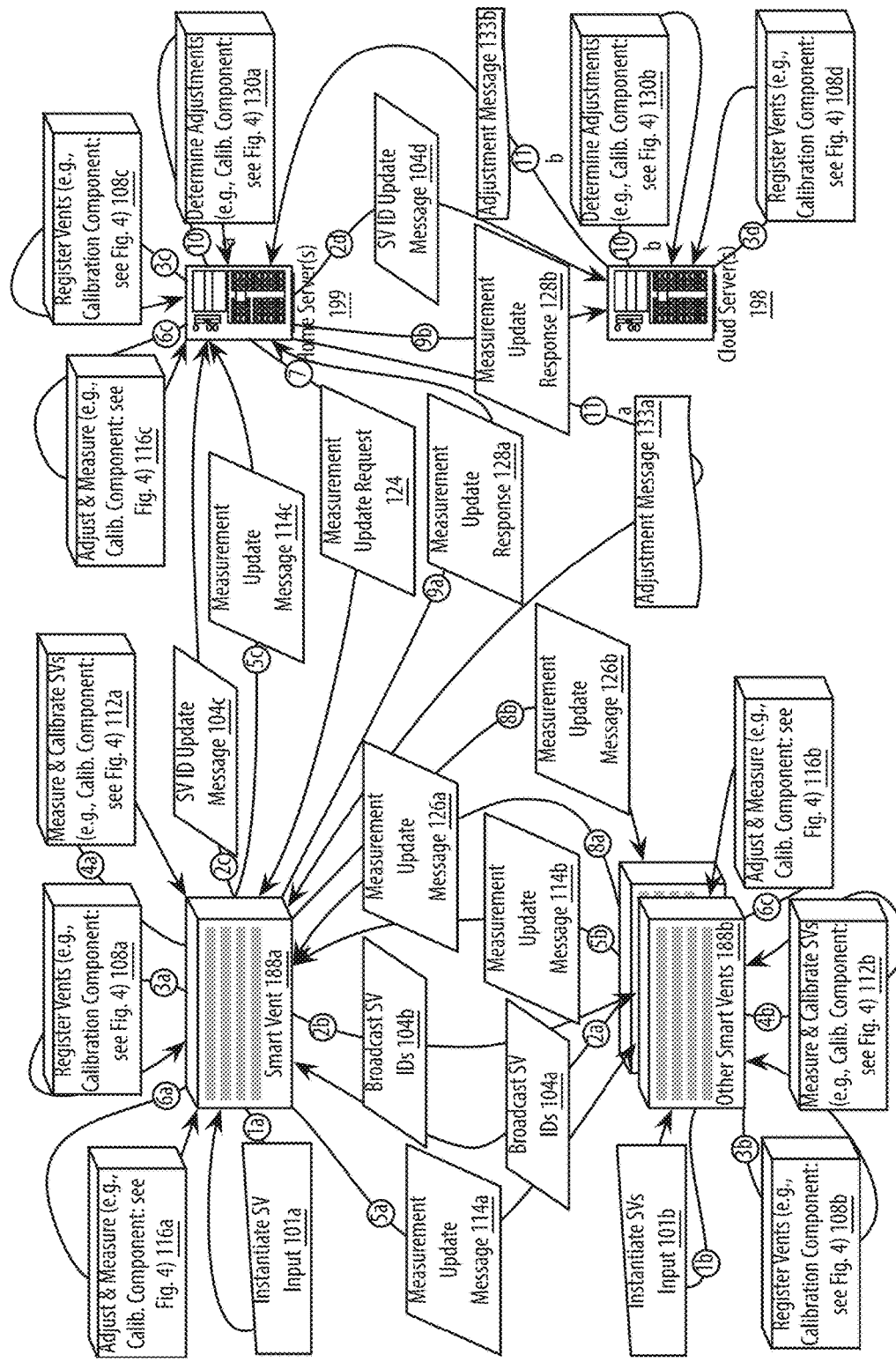
Fig. 1 Datagraph Mesh

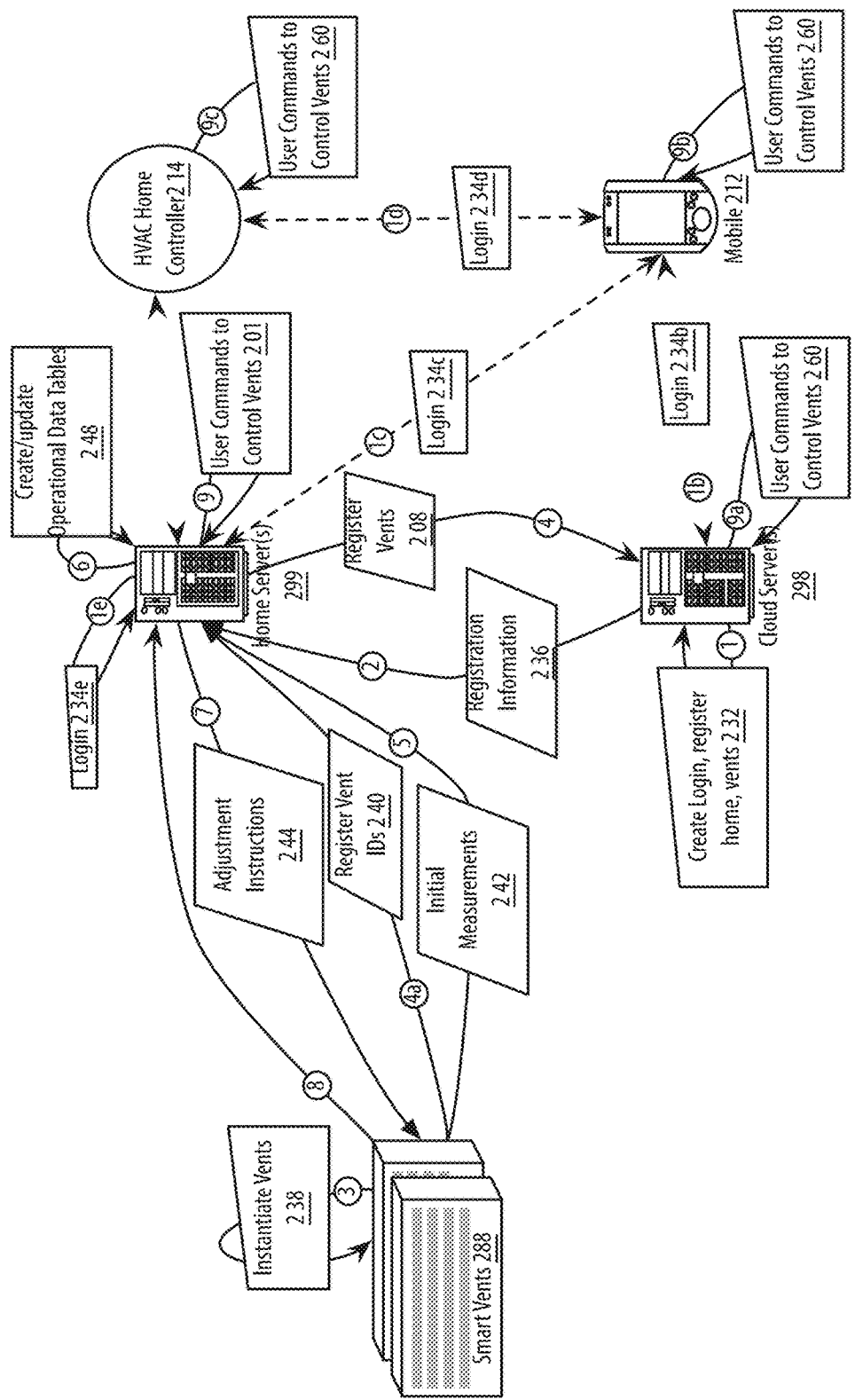
Fig. 2 Datagraph User Adjustment

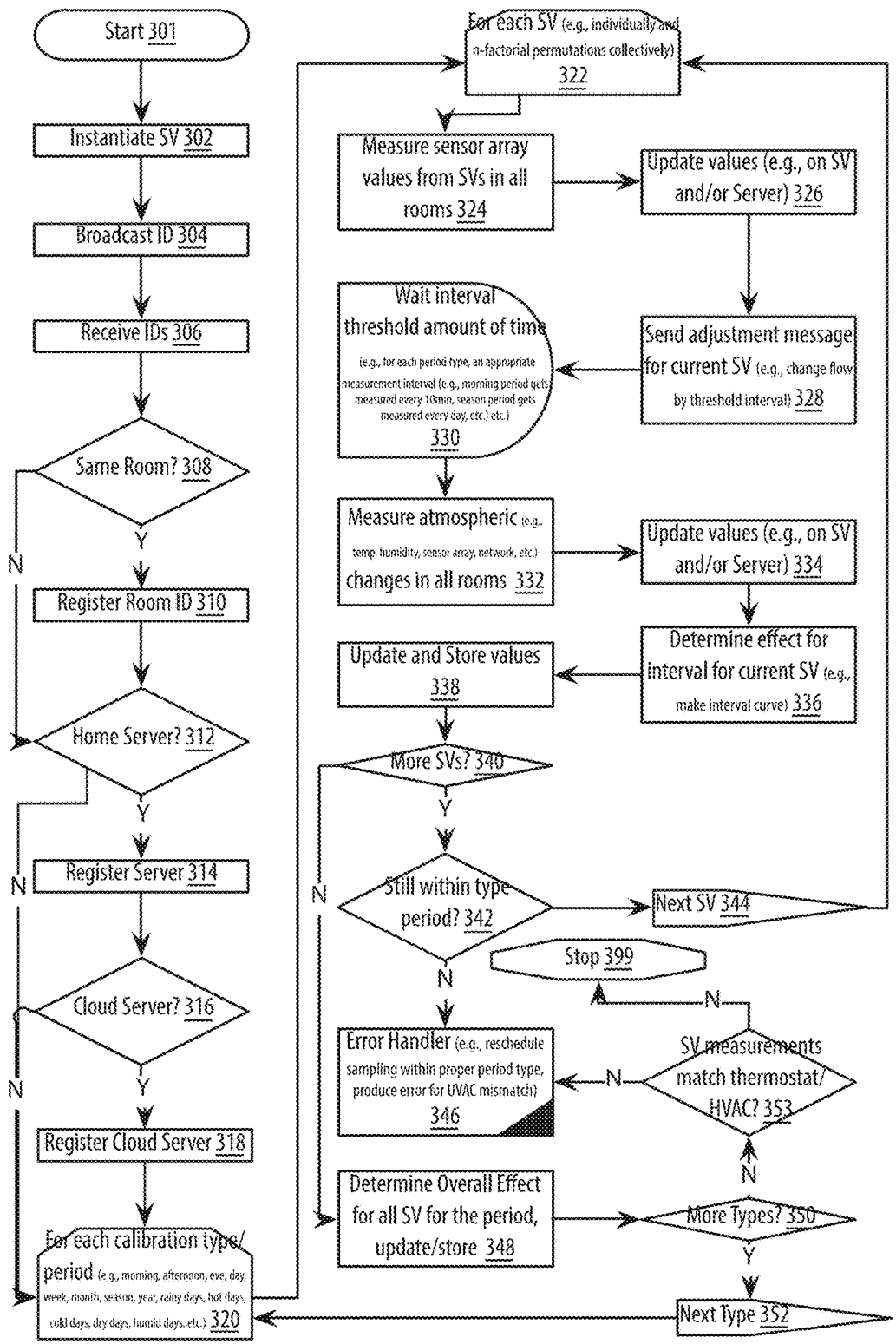
Fig.3 Register and Calibration Component Logicflow

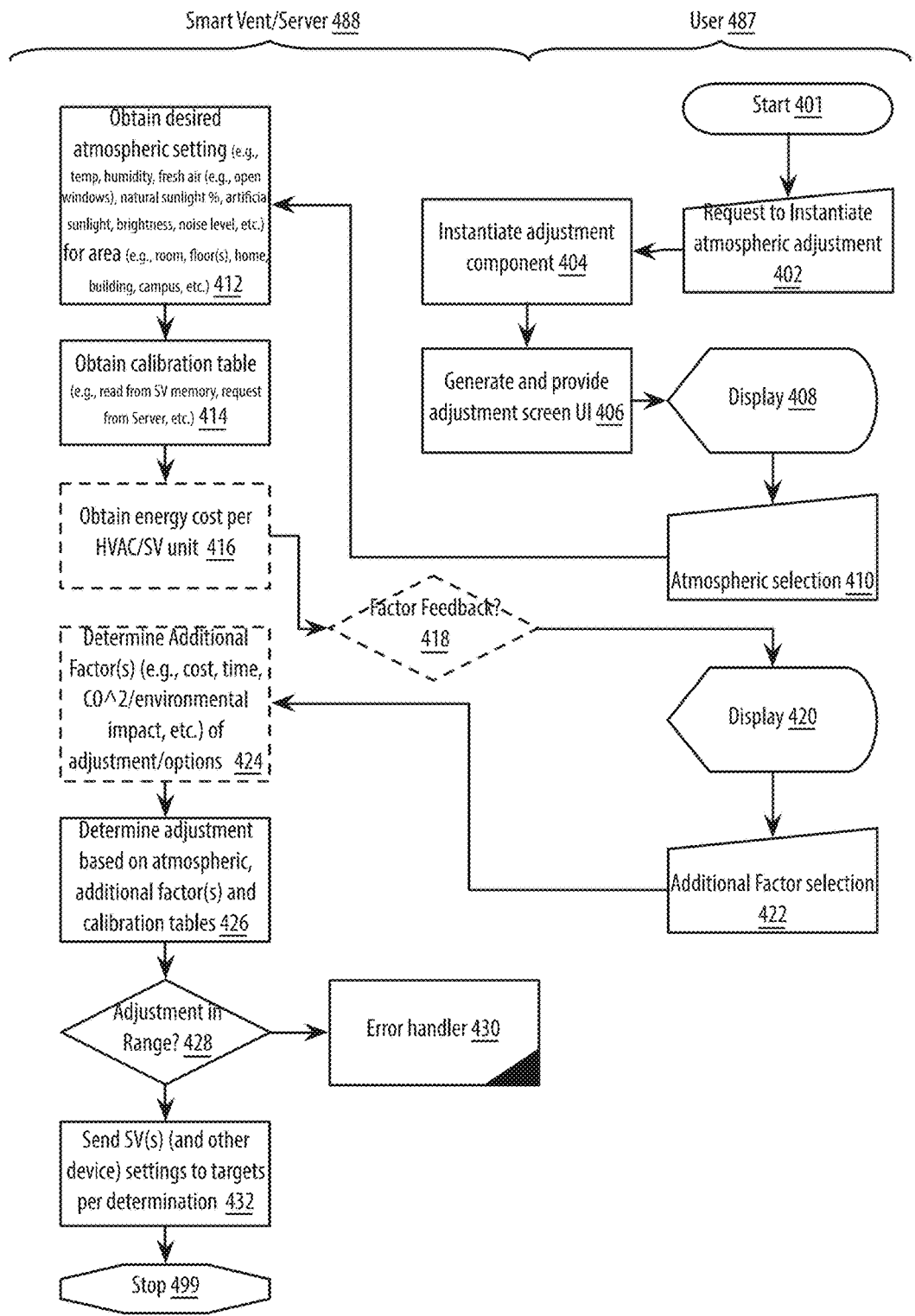
Fig.4 Atmospheric Adjustment Component Logicflow 2

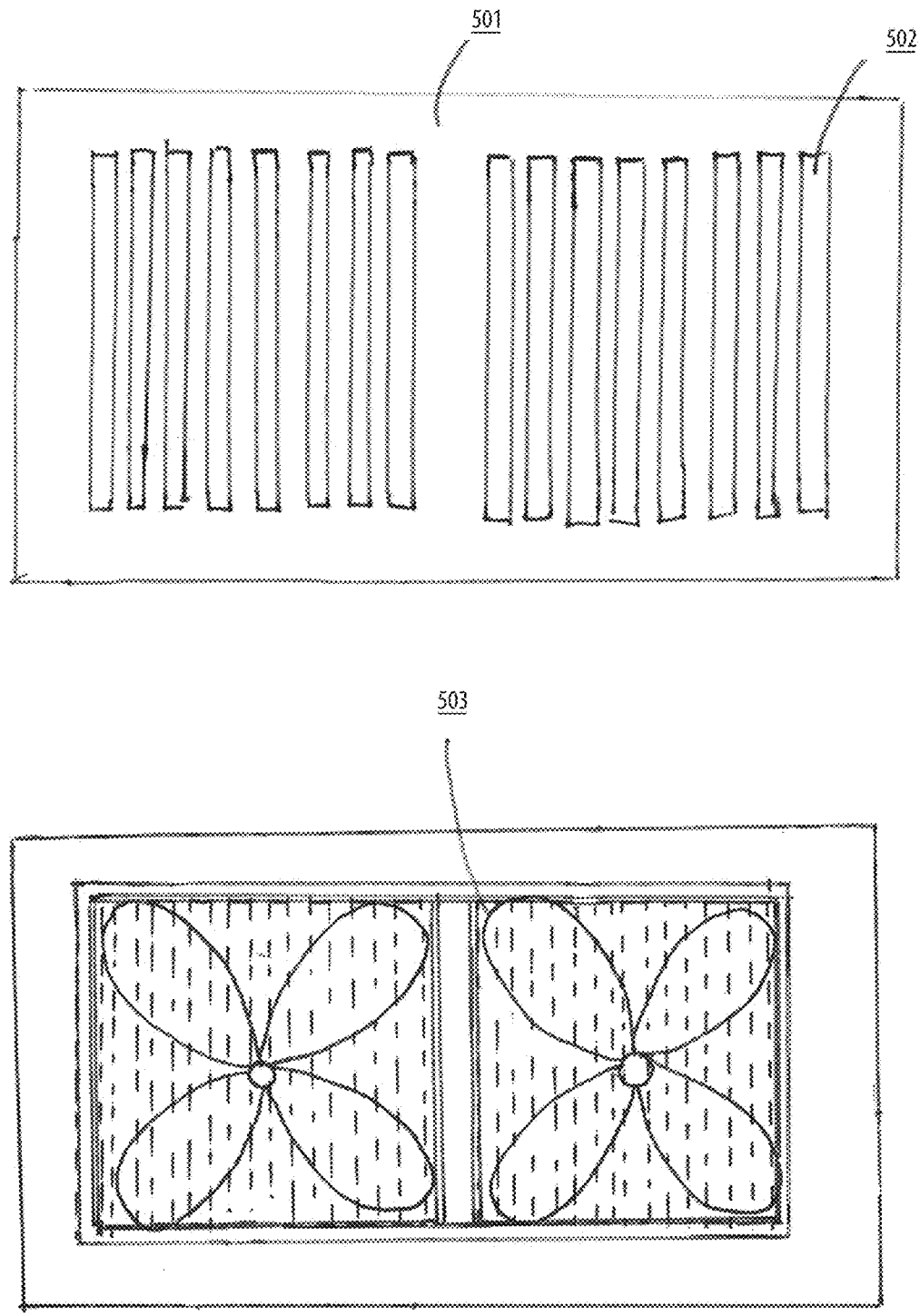
Fig.5 Smart Vent

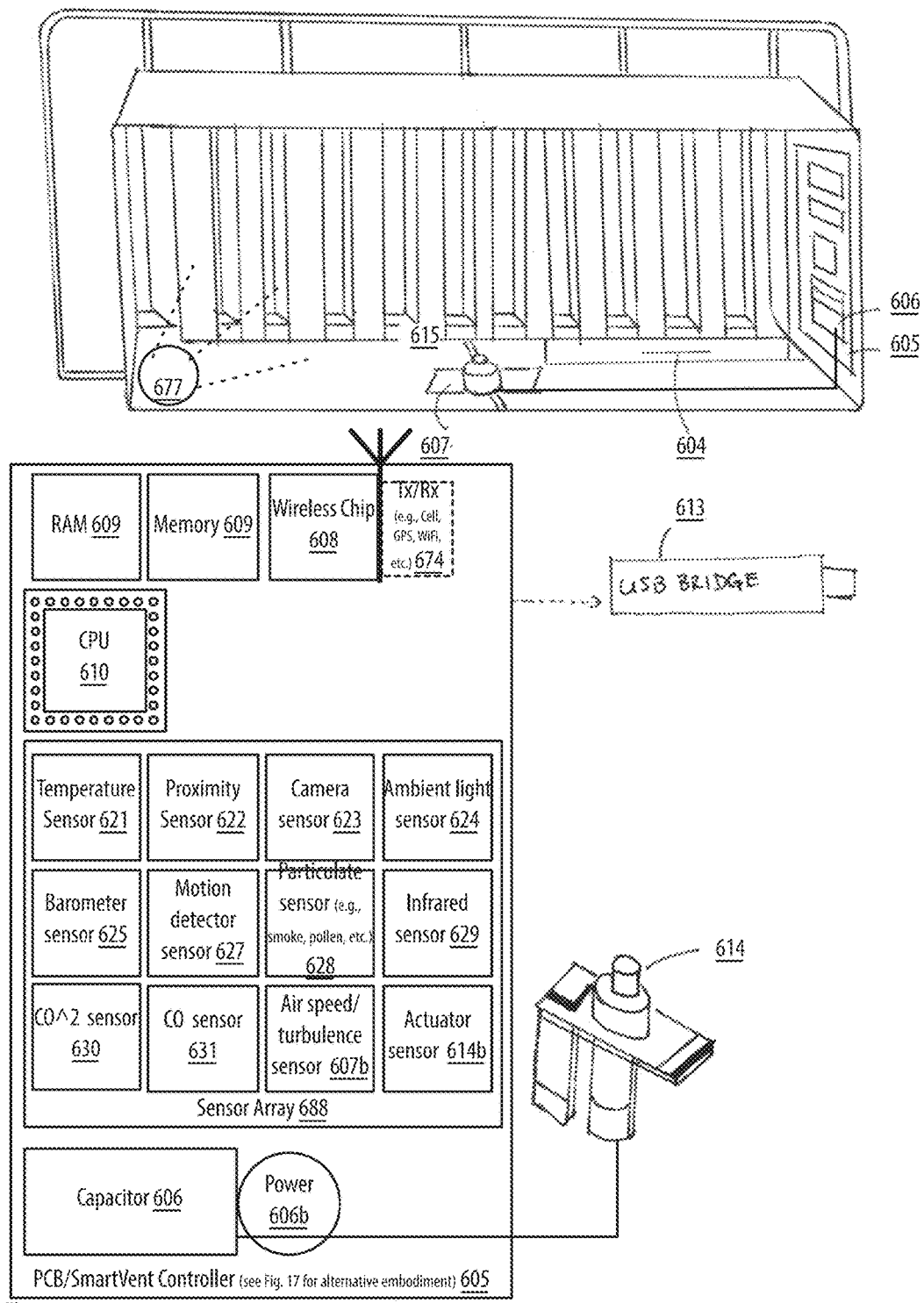
Fig. 6 Smart Vent Actuator

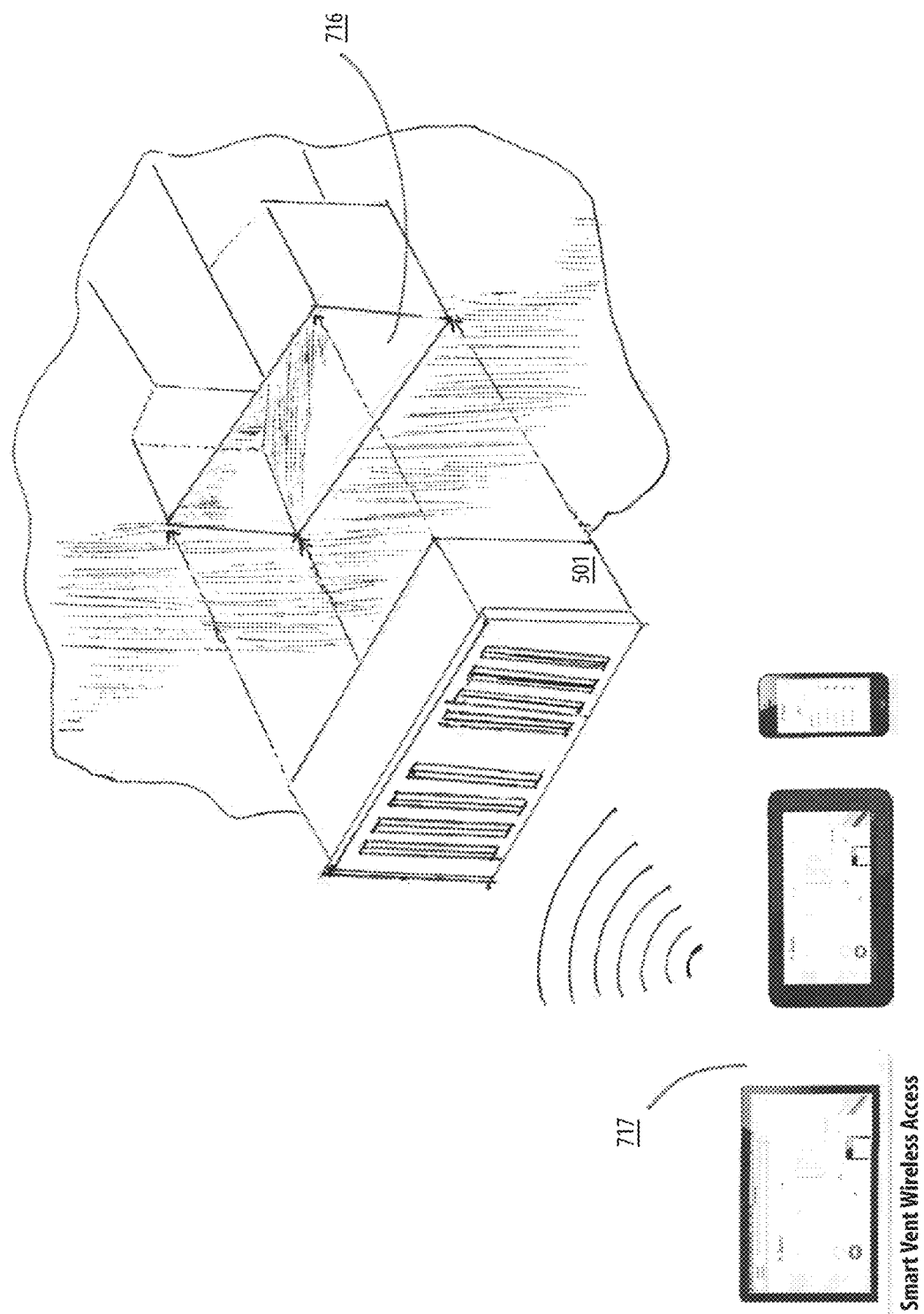
Fig.7 Smart Vent Wireless Access

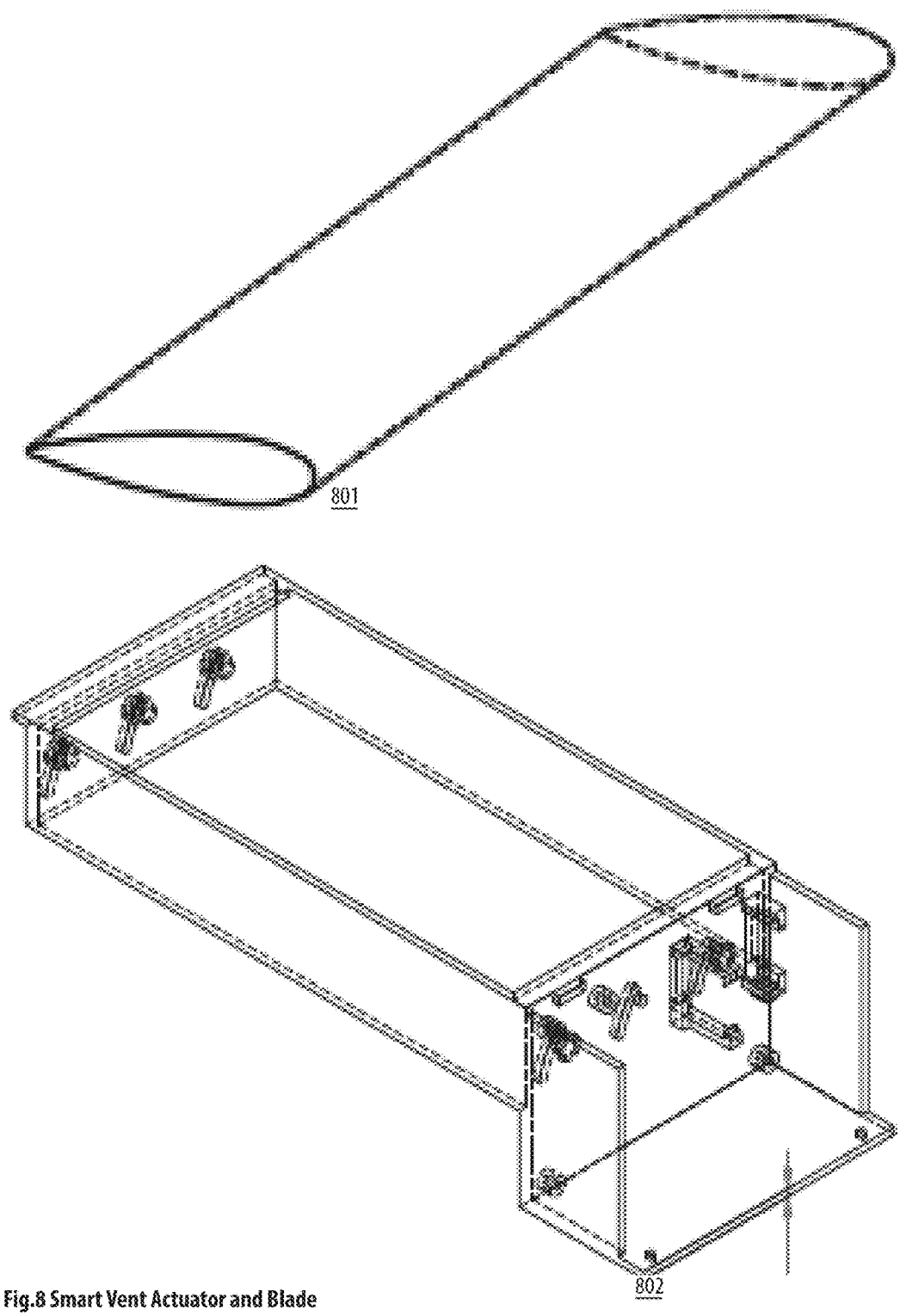
Fig.8 Smart Vent Actuator and Blade

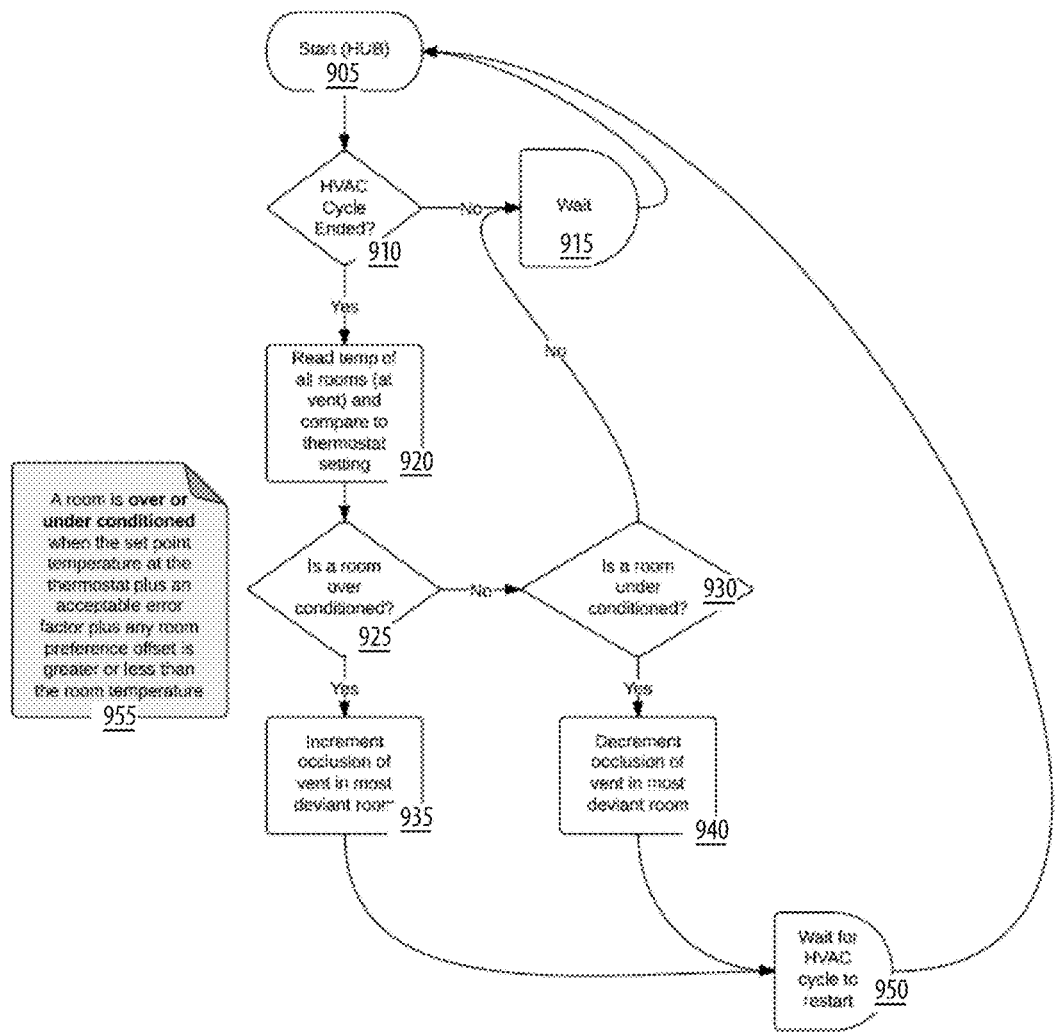
Fig. 9 Smart Vent Calibration Component Logic Flow

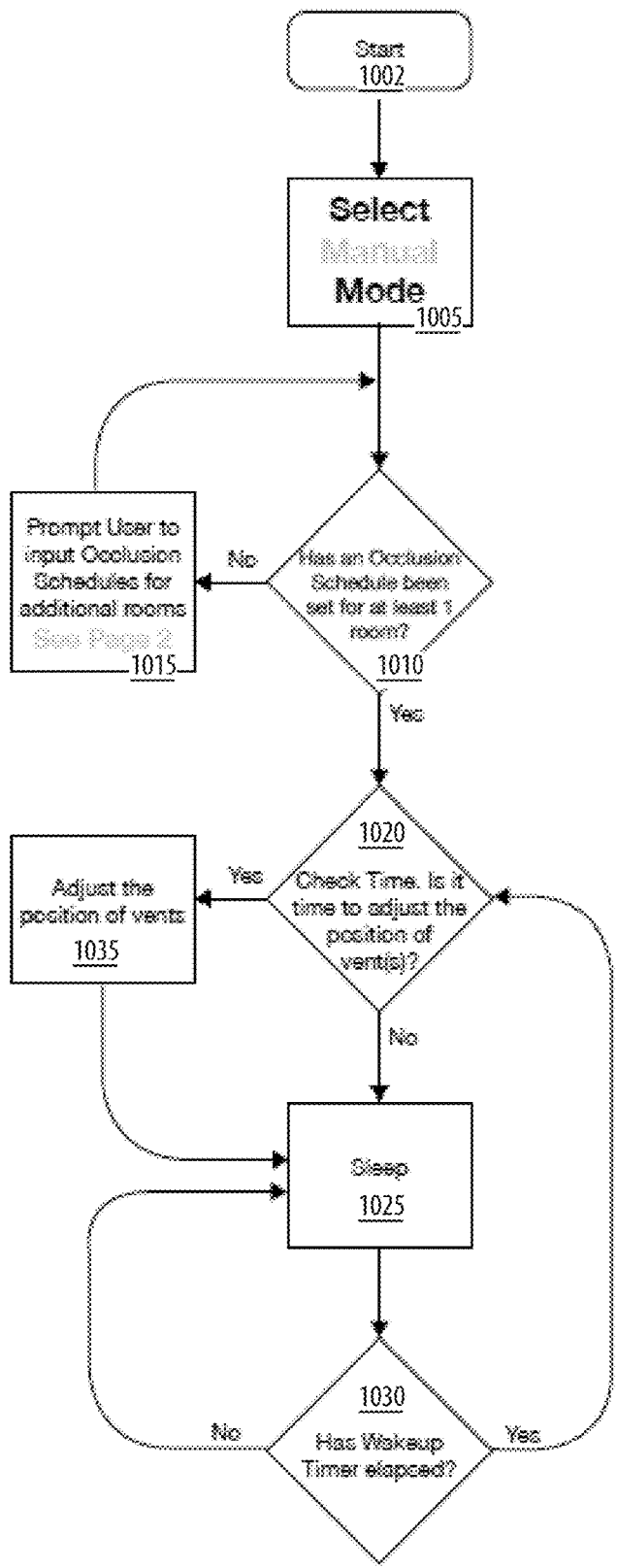
Fig.10 Smart Vent User Setting Component Logic Flow

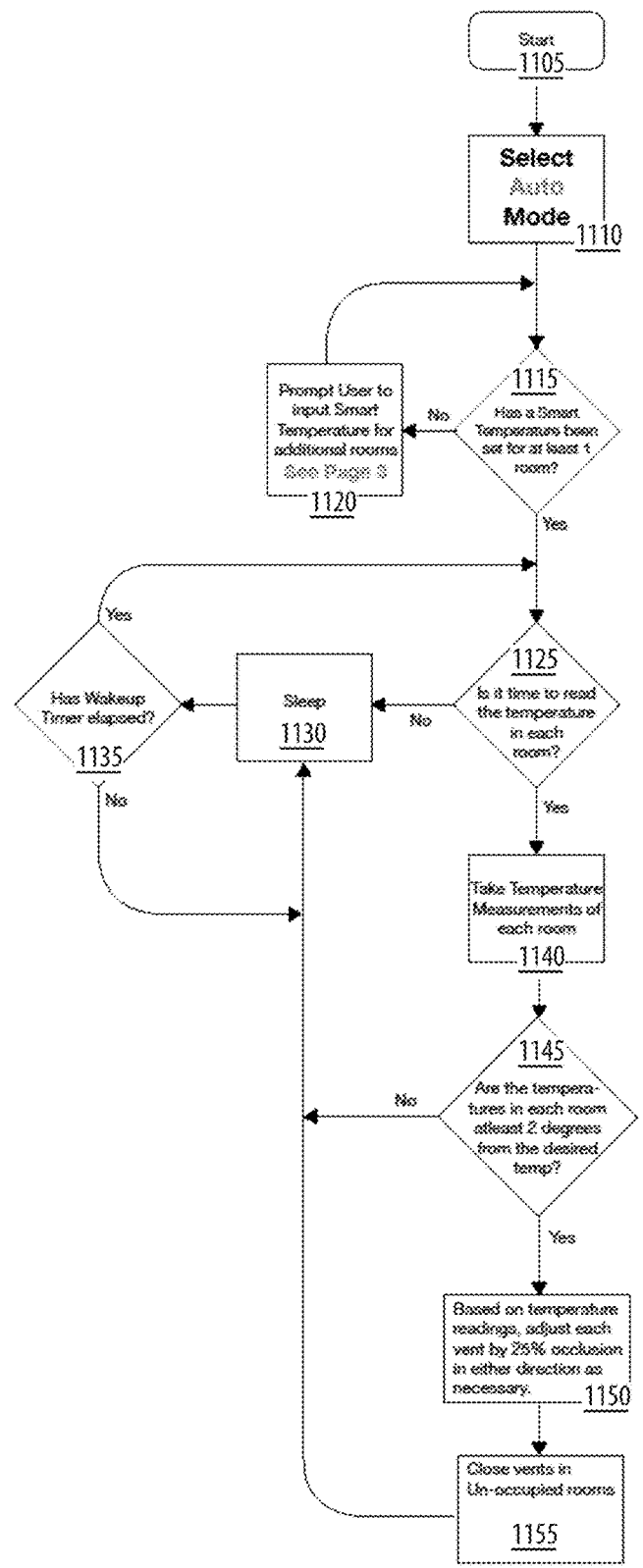
Fig.11 Smart Vent Effect Temperature Component Logic Flow

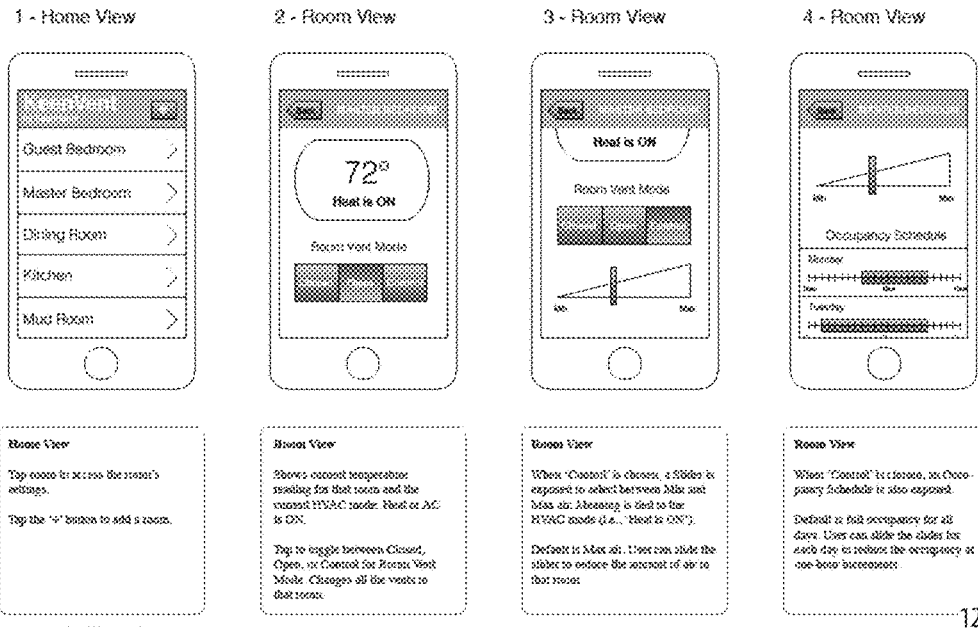
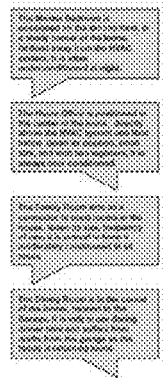
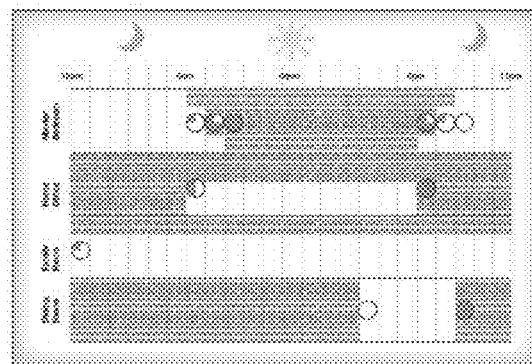
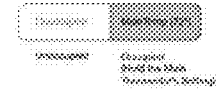
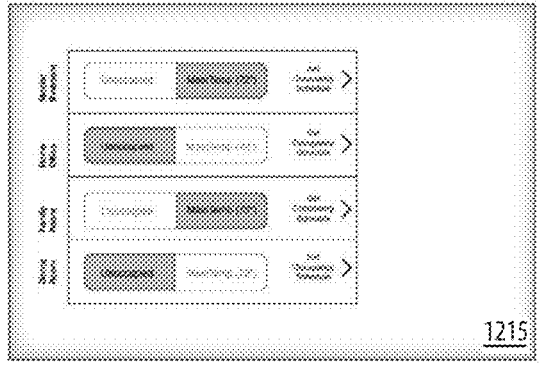
Fig.12 Smart Vent UI Controls

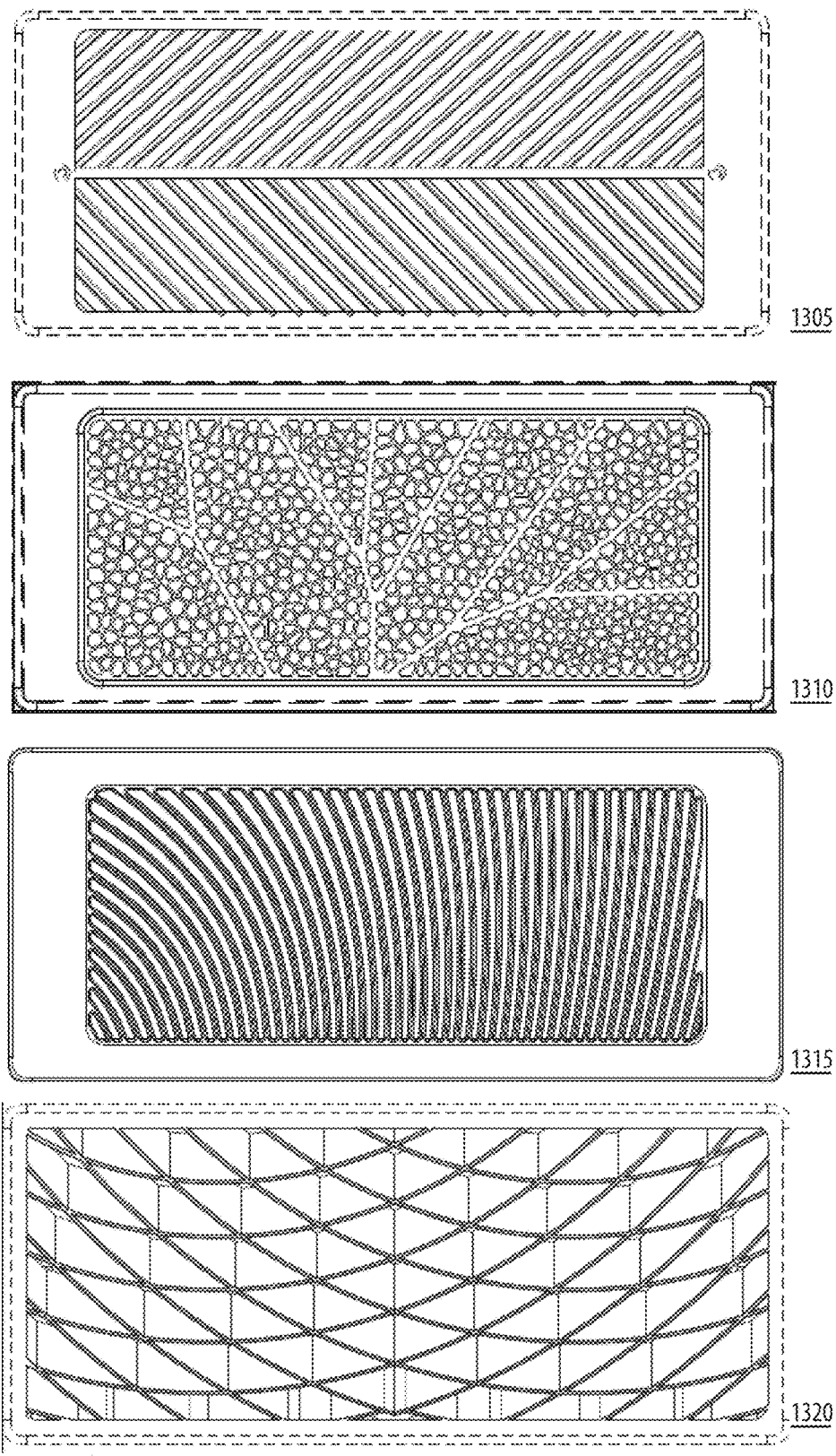
Fig.13 Smart Vent Plates

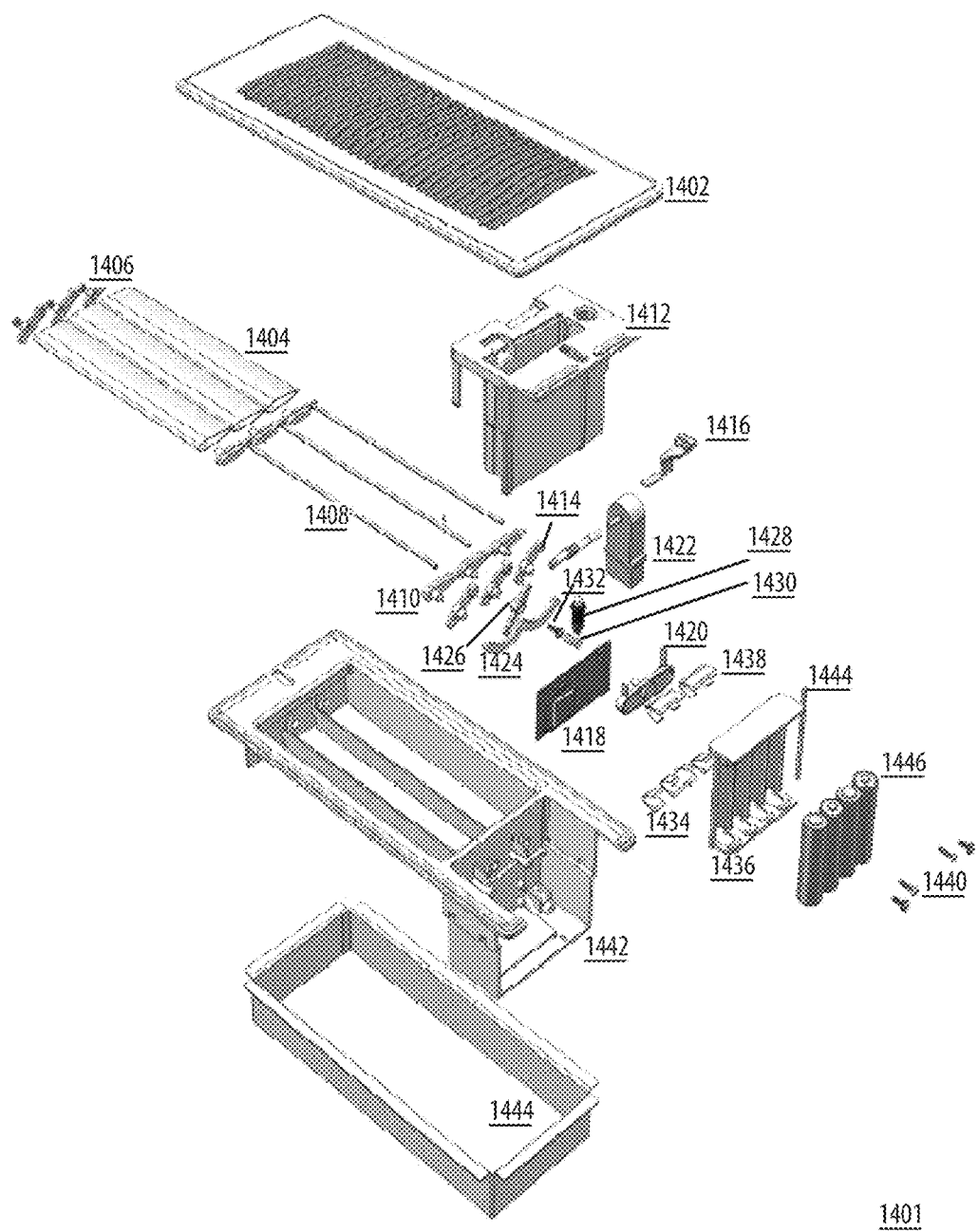
Fig.14 Smart Vent Components

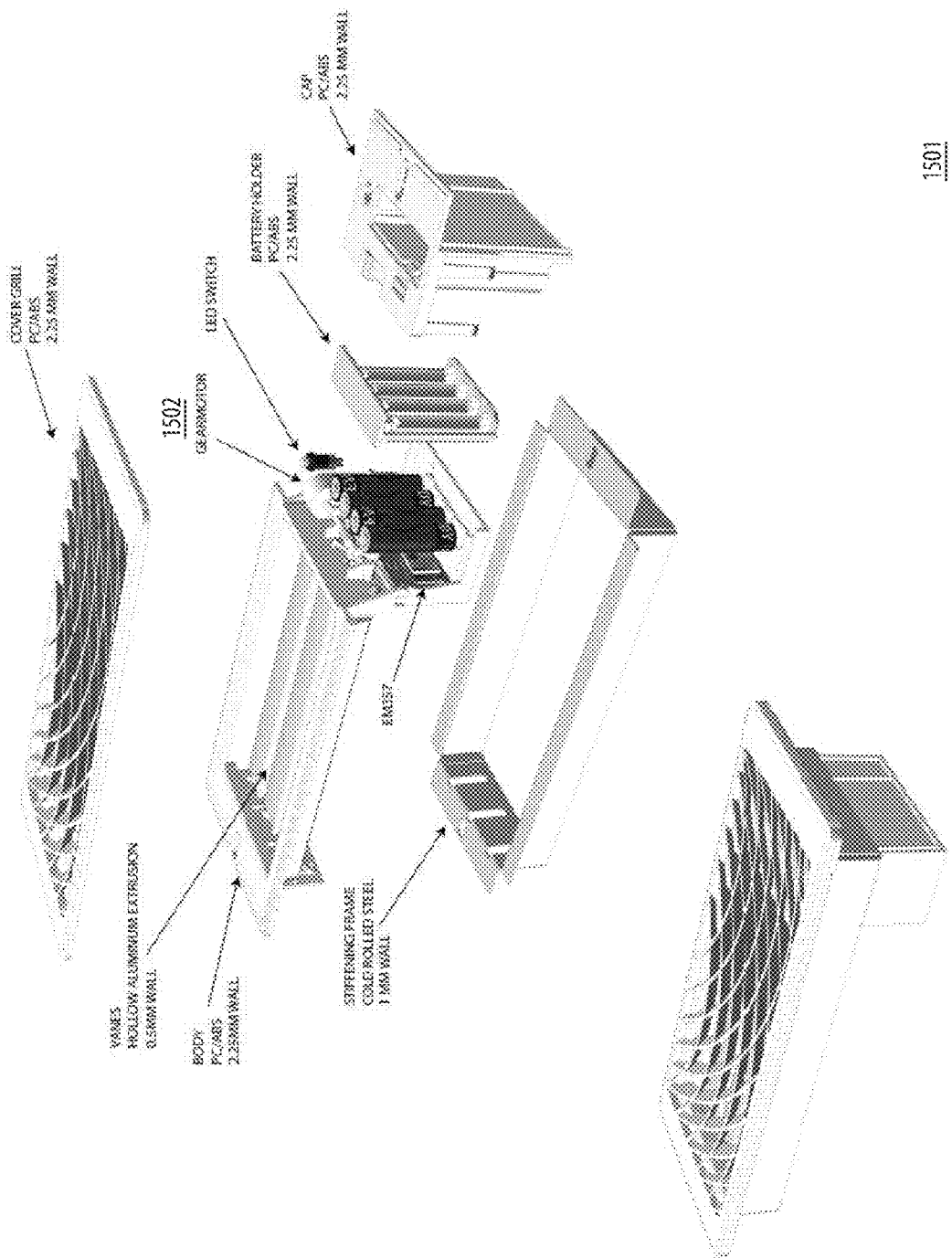
Fig. 15 Smart Vent Assembly

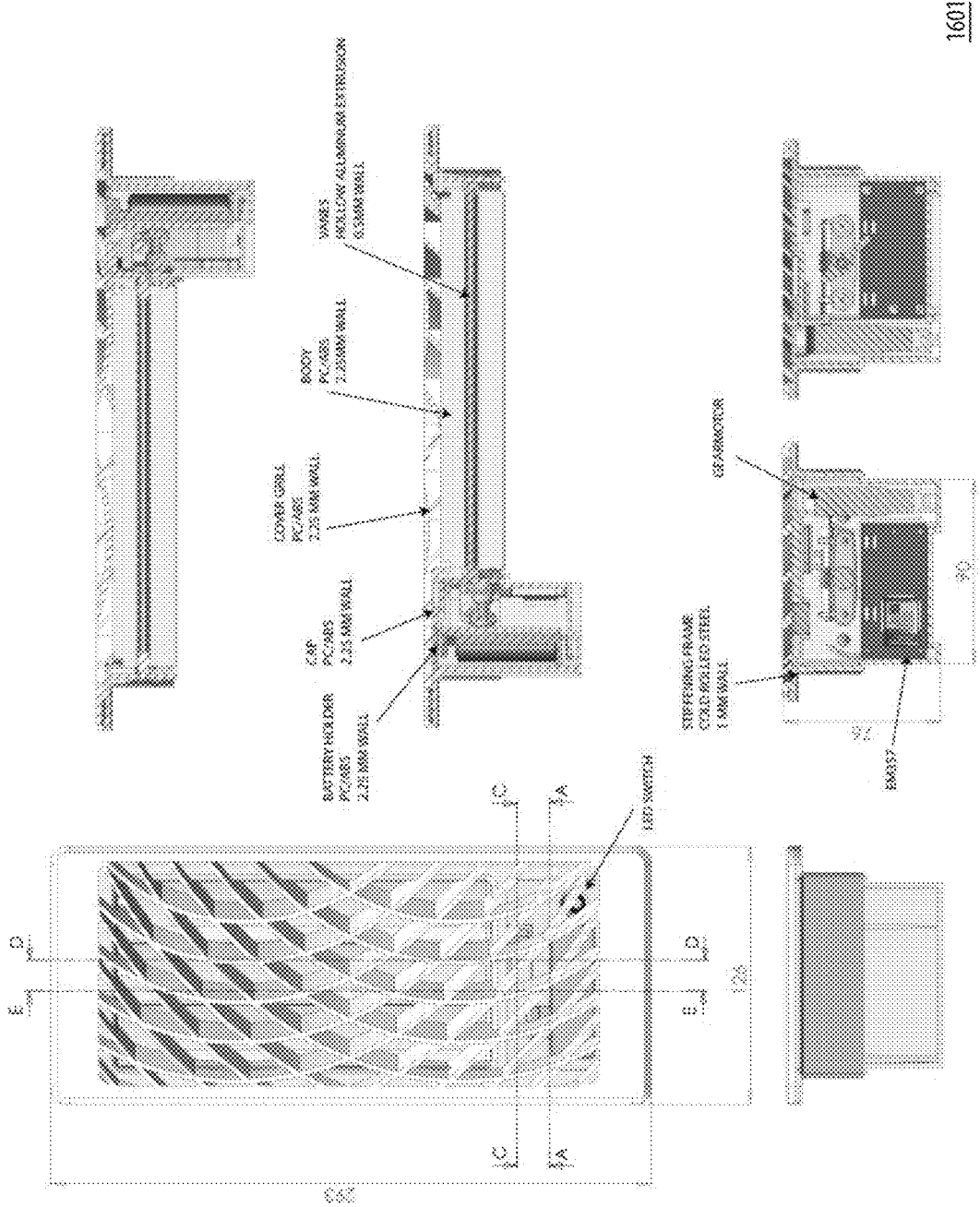
Fig. 16 Smart Vent Cross Section

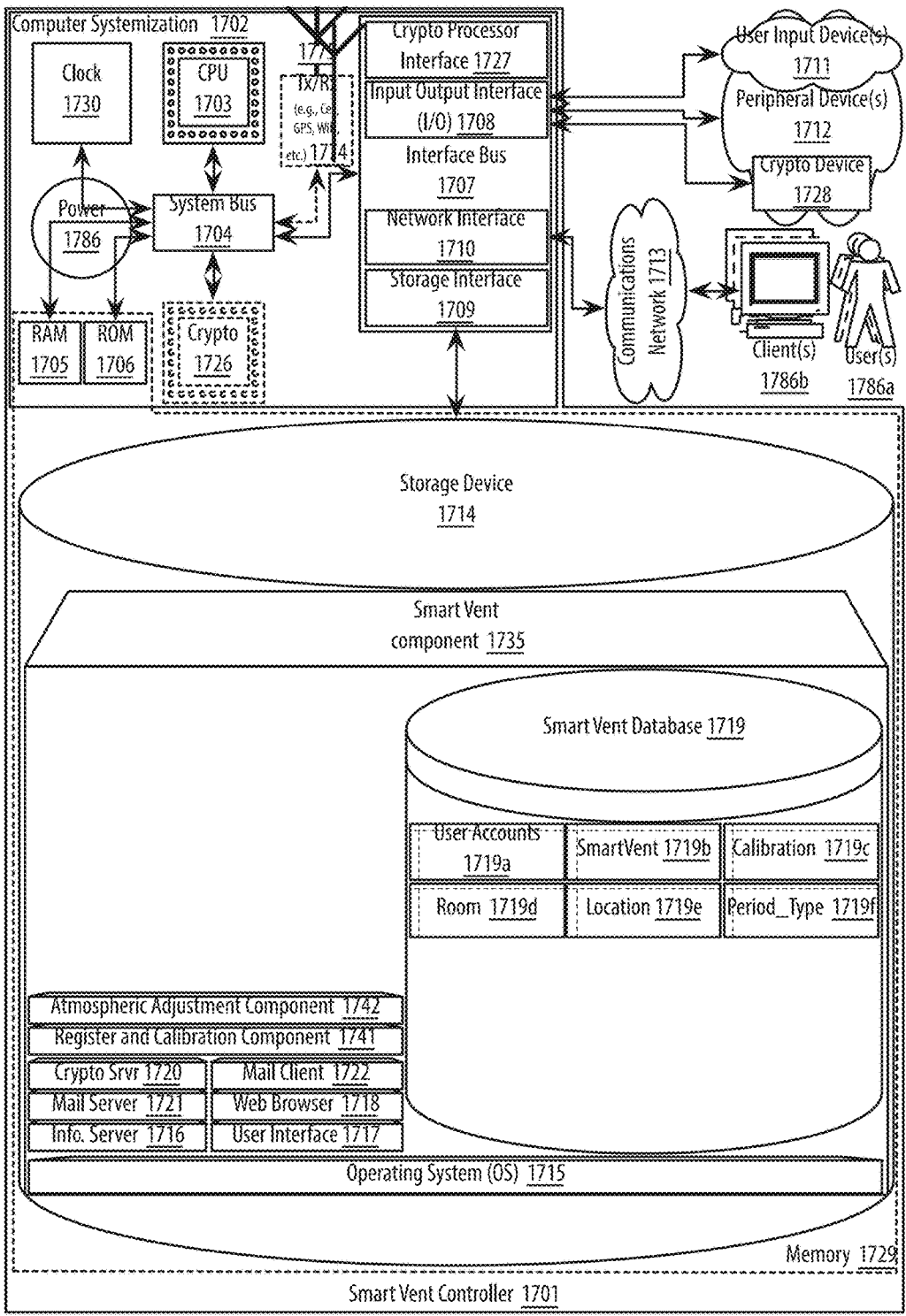
Fig. 17 Smart Vent Systemization Controller 2

Fig. 18 SmartVent Calibration N-Dimensional Table Matrix

SMARTVENT AND ATMOSPHERIC CONTROLLER APPARATUSES, METHODS AND SYSTEMS

CROSS REFERENCE TO RELATED APPLICATIONS

This application is a continuation of U.S. patent application Ser. No. 14/248,879, filed Apr. 9, 2014, which claims the benefit of U.S. Provisional Patent Application No. 61/810,236, filed Apr. 9, 2013, entitled "Wirelessly Network Controlled Air Register" and U.S. Provisional Patent Application No. 61/949,400, filed Mar. 7, 2014, entitled "Method For Detecting Presence."

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address ventilation, and more particularly, include SmartVent and Atmospheric Controller Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Heating ventilation and air conditioning equipment is used to affect the temperature in a home. In particular, homes with ductwork use vents that have manually adjustable apertures that home owners may open and close.

BRIEF DESCRIPTION OF THE DRAWINGS

Appendices and/or drawings illustrating various, non-limiting, example, innovative aspects of the SmartVent and Atmospheric Controller Apparatuses, Methods and Systems (hereinafter "SmartVent") disclosure, include:

FIG. 1 shows a datagraph diagram illustrating embodiments of mesh and server interactions SmartVents;

FIG. 2 shows a datagraph diagram illustrating embodiments of login registration and device interactions with SmartVents;

FIG. 3 shows a logic flow diagram illustrating embodiments of a registration and calibration component for the SmartVent;

FIG. 4 shows a logic flow diagram illustrating embodiments of an adjustment component for the SmartVent;

FIGS. 5-7 show block diagrams illustrating embodiments for the SmartVent;

FIG. 8 shows a block diagram illustrating embodiments of a louver vane and casing for the SmartVent;

FIG. 9 shows a logic flow diagram illustrating embodiments of a SmartVent Calibration Component Logic Flow for the SmartVent;

FIG. 10 shows a logic flow diagram illustrating embodiments of a SmartVent User Setting Component Logic Flow for the SmartVent;

FIG. 11 shows a logic flow diagram illustrating embodiments of a SmartVent Effect Temperature Component Logic Flow for the SmartVent;

FIG. 12 shows a screenshot diagram illustrating embodiments of a room setting controller user interface for the SmartVent;

FIG. 13 shows a block diagram illustrating embodiments of a face plates for the SmartVent;

FIG. 14-16 show block diagram illustrating embodiments of a exploded components, assembled components, and cross-section component views for the SmartVent;

FIG. 17 shows a block diagram illustrating embodiments of a controller for the SmartVent; and FIG. 18 shows a block diagram illustrating embodiments of an n-dimensional calibration matrix table for the SmartVent.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The SmartVent and Atmospheric Controller Apparatuses, Methods and Systems (hereinafter "SmartVent") transforms user desired environmental setting and SmartVent measurement inputs, via SmartVent components (e.g., calibration and adjustment components, etc.), into SmartVent adjustment messages and environmental change outputs. The SmartVent components, in various embodiments, implement advantageous features as set forth below.

Introduction

Studies indicate that the average American household spends half of its total energy bill on heating and cooling costs. The components of this cost include an average of 2-4 rooms over heated or over cooled at any time. In addition to adding unnecessarily to the costs of heating and cooling, this can lead to the spaces identified being uncomfortable for use.

One reason for this inefficiency is that residential Heating, Ventilation and Air Conditioning (HVAC) systems often feature forced air traveling through ducts to vent registers located in all rooms of a building, leading to air being provided to all rooms in a system largely indiscriminately. This inefficiency can be addressed by modifying heating and cooling systems to condition a room only when a human is present, or expected to be present.

Traditional heating and cooling vents allow users to manually open and close registers, preventing a system from heating or cooling specific spaces. To date, efforts to improve the efficiency of systems by opening and closing vents has been limited to easing the process of manually opening and closing vents, such as remote control systems, or bringing intelligence to a thermostat associated with a vent, to allow for certain types of scheduling.

If vent registers can be electronically opened and closed based on event, sensory information, or a more sophisticated schedule, a new level of efficiency and comfort can be realized for users. In order to make these systems more responsive to changing user needs, it is beneficial to incorporate a presence detection system to alert the system to whether people are using certain rooms or are present in the home at all. Methods and procedures disclosed for improving HVAC performance may also be applicable to the broader needs of Home Automation (HA) and the Internet of Things (IoT).

There is a need for more sophisticated systems for efficiently controlling HVAC systems so that rooms are conditioned as needed based on expected or actual human presence.

Smartvent

FIG. 1 shows a datagraph diagram illustrating embodiments of mesh and server interactions SmartVents. FIG. 1 shows various interactions between SmartVents 188A, 188B, home servers 199, and cloud servers 198. SmartVents 188A and other SmartVents 188B may work without interacting with other devices in a distributed mesh communication fashion. Alternatively, the SmartVents 188A, 188B may interoperate and/or be controlled by home servers 199 and/or cloud servers 198.

Initially, a SmartVent 180A may obtain an input from a user and/or system to instantiate the SmartVent 101A. This instantiation may occur after a SmartVent is installed in a duct and/or vent aperture in an environment location (e.g., home, building, campus, etc.). Similarly, multiple other SmartVents 188B may be instantiated 101B (e.g., turned on and begin executing calibration and adjustment components (e.g., see FIGS. 3 and 4) when they are installed. These instantiations SmartVents may occur concurrently, in parallel, serially, at the same and/or different times. Once the SmartVents 188B, 188B are installed and/or instantiated, in a distributed embodiment, the SmartVents may broadcast their identifiers by sending broadcast SmartVents identifier messages 104A, 104B.

In such an embodiment, the SmartVents 188A, 188B may form a mesh network by making note of one another's presence. Each SmartVent may record the identifiers of other SmartVents to allow for future communication. Such broadcast messages may propagate throughout a house where SmartVents at one part of the house that could not otherwise communicate with other SmartVents that are out of range; as such, the SmartVents may transmit their SmartVent identifiers through such SmartVent broadcast identifier messages 104A, 104B, through intermediate SmartVents. Similarly, if at least one SmartVent 188A, is disposed in communication and/or otherwise registered or known by a home server 199 and/or cloud server 198, then the SmartVent 188A may send a SmartVent identifier update message 104C to such a server 199.

One example SmartVent broadcast identifier message 104A, 104B may employ a ZigBee network identifier, e.g., a ZigBee personal area network identifier (PAN ID, see http://www.digi.com/support/kbase/kbaseresultdetl?id=2186 for more information, herein incorporated by reference). An alternative example SmartVent broadcast identifier message request 104A, 104B, 104C, substantially in the form of an HTTP(S) POST message including XML-formatted data, is provided below:

```
POST /authrequest.php HTTP/1.1
Host: localLanIP
Content-Type: Application/XML
Content-Length: 667
<?XML version = "1.0" encoding = "UTF-8"?>
<SmartVent broadcast identifier message>
        <timestamp>2015-04-20 16:20:42</timestamp>
        <channel>10</channel>
        <SmartVent_details>
            <client_type>SmartVent</client_type>
            <client_model>SmartVent</client_model>
            <client_version>1.23</client_version>
            <OS>ZigBee</OS>
            <client_IP>10.0.1.123</client_IP>
            <PAN_ID>0<PAN_ID>
            <Operating_PAN_ID>12</Operating_PAN_ID>
            <NetworkAddress>65535</NetworkAddress>
            //<OS>Android 2.3</OS> (alternative embodiment)
            //<app_installed_flag>true</app_installed_flag>
            (alternative_embodiment
allowing additional apps to be installed on the SmartVent)
            //<installed_app_list>app1, app2, app3</installed_
            app_list> (alternative
embodiment application list)
            //<alternative_radio>WiFi, Bluetooth</alternative_
            radio> (alternative
embodiment detailing additional communication channels)
            //<SmartVent_GPS>40.8, −73.9<SmartVent_GPS>
            (alternative embodiment
providing vent position)
            //<SmartVent_Beacon_ID>123</SmartVent_Beacon_ID>
            (alternative embodiment
providing vent position)
            //<SmartVent_Beacon_Coordinates>40.80972270282384, −
73.95286297183878</SmartVent_Beacon_Coordinates>
        </SmartVent_details>
</SmartVent broadcast identifier message>
```

As such SmartVent broadcast identifier messages 104A, 104B, 104C, 104D are transmitted, each SmartVent 188A may register other SmartVents based on these received SmartVent broadcast identifier messages 104A, 108A (see FIG. 3 for additional detail). Similarly, other SmartVents 188B may also register any identified SmartVents 108B, as may any home servers 199, 108C and cloud servers 198, 108D.

Once the SmartVents 188A, 188B and servers 199, 198, have registered the SmartVents 188B, 188B, they begin to measure and calibrate (see calibration component in FIG. 3) 112A, 112B. As such, the SmartVent 188A, 188B may begin to access its sensor array to determine what values are being measured (e.g., air flow rate, airflow temperature, humidity, time, barometric pressure, light, pollen count, pollutants, airflow aperture setting, etc.). Such measurements may be used for the calibration and/or for pure measurement. As SmartVents 188A, 188B take measurements 112A, 112B, the SmartVents 188A, 188B may begin sending measurement update messages 114A, 114B, 114C between themselves so as to aid in the calibration and maintenance of the SmartVent mesh, and system. An example of the SmartVent measure update message 114A, 114B, 114C substantially in the form of an HTTP(S) POST message including XML-formatted data, is provided below:

```
POST /authrequest.php HTTP/1.1
Host: localLanIP
Content-Type: Application/XML
Content-Length: 667
<?XML version = "1.0" encoding = "UTF-8"?>
<SmartVent_measure_update_message>
        <timestamp>2015-04-20 16:20:42</timestamp>
        <channel>10</channel>
```

```
<SmartVent_details>
    <client_type>SmartVent</client_type>
    <client_model>SmartVent</client_model>
    <client_version>1.23</client_version>
    <OS>ZigBee</OS>
    <client_IP>10.0.1.123</client_IP>
    <PAN_ID>0</PAN_ID>
    <Operating_PAN_ID>12</Operating_PAN_ID>
    <NetworkAddress>65535</NetworkAddress>
</SmartVent_details>
<measurements>
    <temperature>"Temp C = 30", 30</temperature>
    <proximity>False</proximity>
    <camera>JPG_Data</camera>
    <ambient_light>.5</ambient_light>
    <barometer>30.03Hg<barometer>
    <particulate>.005</particulate>
    <motion_detection>.01</motion_detection>
    <infrared>JPG_Data_Heat_map</infrared>
    <CO2_level>.1</CO2_level>
    <CO_level>.11</CO_level>
    <aperature>.25</aperature>
    <flow_speed>5mph</flow_speed>
</measurements>
</SmartVent_measure_update_message>
```

As the SmartVents 188A, 188B obtain such measurement update messages 114A, 114B, 114C, SmartVents may then employ an adjustment and measurement calibration component (see FIG. 3) 116A, 116B to use the updated settings to affect a desired temperature for an individual location, space, room and/or a larger environment (e.g., a floor, house, building etc.). Similarly, the home server 199 and/or a cloud server 198 obtaining similar measurement update messages 114C, may use such update information to arrive at adjustment measurement and calibrations for the environment 116C. The servers 199, 198 and/or other SmartVent 188B may generate and send a target SmartVent 188A an update request message 124, so that the SmartVent 188A will provide the latest measurement values back to the requesting device/servers. In one embodiment, a SmartVent may employ a command from its printed circuit board (PCB) substantially in the example form, below, for example, to obtain a temperature update: emberSerialPrintf(APP_SE-RIAL, "Temp C=% d\r\n", tempC)

An example call to a SmartVent microcontroller may be sent by a smarthub to generate a SmartVent update request message 124 and substantially may take the form as follows:

```
device.id.attribute.temperature //to generate a temperature request message
device.id.attribute.proximity //to generate a proximity request message
device.id.attribute.cameraStill //to generate a still camera request message
//<camera>device.id.attribute.cameraVideo //to generate a
video request message
device.id.attribute.ambient //to generate an ambient light request message
device.id.attribute.barometer //to generate a barometer request message
device.id.attribute.particulate //to generate a particulate request message
device.id.attribute.motion //to generate a detect motion request message
device.id.attribute.infraredMap //to generate an infrared heat
map request message
device.id.attribute.CO2 //to generate a CO2 Level request message
device.id.attribute.CO //to generate a CO request message
device.id.attribute.aperture //to generate an aperture state request message
device.id.attribute.flowSpeed //to generate a flow speed request message
```

An example of the SmartVent update request message 124 substantially in the form of an HTTP(S) POST message including XML-formatted data, is provided below.

```
POST //authrequest.php HTTP/1.1
Host: localLanIP
Content-Type: Application/XML
Content-Length: 667
<?XML version = "1.0" encoding = "UTF-8"?>
<SmartVent_update_request_message>
    <timestamp>2015-04-20 16:20:42</timestamp>
    <channel>10</channel>
    <SmartVent_details>
        <client_type>SmartVent</client_type>
        <client_model>SmartVent</client_model>
        <client_version>1.23</client_version>
        <OS>ZigBee</OS>
        <client_IP>10.0.1.123</client_IP>
        <PAN_ID>0</PAN_ID>
        <Operating_PAN_ID>12</Operating_PAN_ID>
        <NetworkAddress>65535</NetworkAddress>
    </SmartVent_details>
    <measurement_request>
        <temperature>Request_temperature</temperature>
        <proximity>Request_proximity</proximity>
        <camera>Request_cameraStill</camera>
        //<camera>Request_cameraVideo</camera>
        <ambient_light>Request_ambient</ambient_light>
        <barometer>RequesUparometer<barometer>
        <particulate>Request_particulate</particulate>
        <motion_detection>Request_motion</motion_detection>
        <infrared>Request_infraredMap</infrared>
        <CO2_level>Request_CO2</CO2_level>
        <CO_level>Request_CO</CO_level>
        <apeature>Request_aperture</aperture>
        <flow_speed>Request_flowSpeed</flow_speed>
    </measurement_request>
</SmartVent_update_request_message>
```

In response to such a message 114C, and/or to such measurement update request messages 114A, 114B sent as between the SmartVents 188A, 188B (e.g., in a mesh environment), measurement update messages 126A, 126B may be propagated, and similarly the SmartVents 188A, 188B may send measurement update responses 128A, 128B to the servers 199, 198. The servers 199, 198 may make further adjustments and determinations via a calibration component (see FIG. 3) 130A, 130B. In such a manner, the servers may take into account various factors either in the locality of a home 199, and/or aggregating values from environments across regions to better calculate adjustments. As such, the servers 199, 198 may send an adjustment message 133 to the SmartVents 188A, 188B for propagation among the SmartVents; in this manner, greater computational and data sources may be used to adjust the SmartVent settings to better achieve goals of occupants and users of the SmartVents.

An example of a command to generate a SmartVent adjustment message 133 is shown below, substantially in Groovy language format; such a command may be resident on the SmartVent and/or servers (e.g., with a SmartThings device implementation via type handler in its cloud IDE; each example shown is written specifically for SmartVents devices but may on other devices such as in the cloud and/or on a local hub device):

```
//Groovy Language on the smartthings platform for arduino
    development board, zigbee
def setLevel(value) {
    log. trace "setLevel($value)"
    sendEvent(name: "level", value: value)
    def level = new BigInteger(Math.round
    (value * 255 / 99).toString( )).
    toString(16)
    zigbee.smartShield(text: "set ${level}").format( )
}
```

```
//Second example (Ember device)
//Groovy language on the smartthings platform for ember
(most relevant)
def setLevel(value) {
    log.trace "setLevel($value)"
    sendEvent(name: "level", value: value)
    def level = new BigInteger(Math.round(value * 255 /
100).toString( )).toString(16)
    def cmd = "st cmd 0x${device.deviceNetworkId}
    1 8 4 {${level} 2000}"
    log.debug cmd
    cmd
}
```

FIG. 2 shows a datagraph diagram illustrating embodiments of login registration and device interactions with SmartVents. FIG. 2 shows an alternative embodiment and interaction as between SmartVents 288, home servers 299, cloud servers 298, HVAC controllers 214 and/or mobile devices 212.

With regard to common HVAC systems, it should be noted that with many current HVAC configurations, thermostats often only have temperature data at the location of the thermostat (often a hallway or great room). As such, current HVAC systems often lack often highly varied temperature data about the rest of the house. Other floors, isolated rooms, and rooms receiving large amounts of sunlight often vary widely. One advantage of SmartVents is they may provide real-time data about temperatures in these areas of the home and can provide an aggregate picture of the distributed or average temperature of the home. This data can be provided through a common hub an/or by directly talking over a local network (ZigBee, Z-wave, WiFi). SmartVents with presence detectors in them can be used to create a learning schedule for thermostats. SmartVents could also send commands to thermostats directly requesting more or less airflow. Further, SmartVents can make use of data from other connected devices. Devices such as motion detectors can be leveraged to create predictive schedules of room by room occupation. Other ZigBee Devices often have thermistors built into them. If the device is known to be located in proximity to the vent, these can serve as temperature detecting devices for the room. As such, SmartVents may employ and provide a wider array and more accurate set of measurements, and may even be used to increase the fidelity of (e.g., as a diagnostic to) existing HVAC systems (e.g., see 353 of FIG. 3).

In this embodiment, a user of the system can create/register an account and login 232 at a cloud server 298. Similarly, a login may originate from a mobile device 212, 234B and propagate to a cloud server 298, to a home server 234C, and/or HVAC home controller 234D. Also, a user may login straight through the home server 234E. In one embodiment, the login 232 at the cloud server 298 may provide a registration information message 236 to the home server 299.

SmartVents 288 may be instantiated 238 when they are installed and engaged. SmartVents may register their identifiers by sending a register event identifier message to 242 a home server 299. Home server 299 may further this information by itself sending a SmartVent registration message 208 to the cloud server 298. The SmartVents 288 may continue to obtain measurements and send an initial measurement messages 242 to the home server 299. With these values, and in one embodiment, the home server 298 may create and/or update operational data tables 248. Alternatively, the SmartVents 288 may create and/or update such operational data tables themselves. The home server 299 may then send an adjustment instruction message 244 to the SmartVents 288 so as to provide settings for the SmartVents to better achieve any user-specified environmental settings. The SmartVents 288 may then send additional measurements 245 back to the home server 299. A user and/or system may provide commands and controls by way of desired environmental settings (e.g., desired SmartVent aperture settings, temperatures, etc.) 201. In addition, such user commands may be provided via mobile 260, a cloud server 298, 260 and/or through the HVAC home controller 214, 260.

FIG. 3 shows a logic flow diagram illustrating embodiments of a registration and calibration component for the SmartVent. This component may execute on the SmartVents themselves, a home server, and HVAC system, a mobile device, a cloud server, and/or the like. The component starts 301 by being instantiated, for example, as part of the SmartVent 302. The SmartVent and/or SmartVent controller broadcasts its identifier 304. Similarly if other SmartVents and/or SmartVent controllers have been instantiated, the instant component may receive broadcast identifiers 306. As it received, and/or continues to receive such identifiers, the calibration component may then determine if such identifiers have been obtained from the same room 308. If yes, the calibration component will register identifiers as belonging to the same room identifier 310. Otherwise the calibration component will then determine if any of the identifiers that have been broadcast and received are from a home server 312. If yes, the calibration component will register the server 314, and then go on to determine if any of the identifiers that have been received are from a cloud server 316. If yes, the calibration component will register the clouds server 318. Such registrations may occur by being stored in a SmartVent controller database 1719 of FIG. 17.

Otherwise the calibration component will begin to calibrate the instant SmartVent as it relates to all other registered and identified SmartVents for various types and periods of settings 320. For example, the SmartVent's effects on its environment may react differently during different periods of time (e.g., cooling may be easier at night than during the day, warming is easier during the summer season, etc.). As such, a SmartVent database controller may have a database table denoting various types and periods and specifics for calibrating under each of such types and periods. Example types and periods include: morning, afternoon, evening, daytime, week, month, season, year, rainy days, hot days, cold days, dry days, humid days etc. as such, the calibration component will perform a calibration for each such type and period 320.

Figure 18:
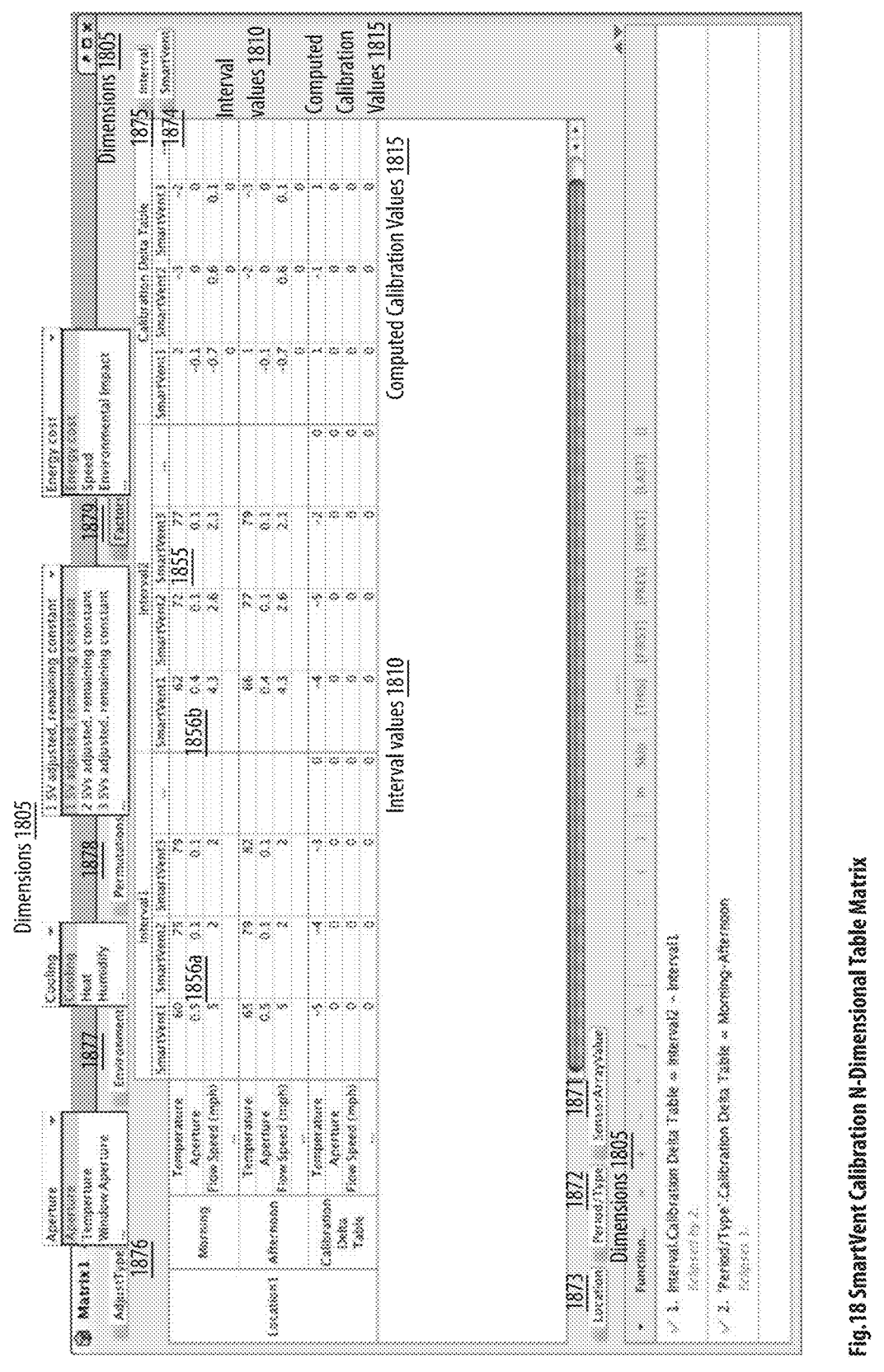

Additionally, the calibration component may perform a calibration for each SmartVent in an identified list/array of registered SmartVents 322. Such calibrations may be performed individually for each individually registered SmartVent, and/or via n-factorial a permutations as between all registered SmartVents 322; for example, while performing calibration and modifying the values of only a singular SmartVent and measuring its impact on all other rooms/locations/SmartVents may be one implementation and embodiment, varying two SmartVents at a time, then three SmartVents at a time, and all n-factorial permutations of SmartVent interactions, may provide interesting calibration table values (see FIG. 18 for an example calibration table) that vary from information obtained while doing a singular calibration for each SmartVent.

As such and for each SmartVent 322, the calibration component may measure the sensor array values from SmartVents in all identified rooms and from all identified SmartVents 324. Such obtained values 324, may then be updated on the servers and/or SmartVents themselves; e.g., stored on the devices 326. Afterwards the calibration component may cause the sending of an adjustment message or the current SmartVent (e.g., change the flow by some threshold interval) 328. For example, if the SmartVent has an actuator that will change its flow rate, and if such actuator has a field of motion having 10 step settings, the calibration component may increment the actuator to its next setting by one (e.g., causing the SmartVent aperture to decrease from a 50% opening down to a 40% opening). After sending this adjustment message 328, the calibration component may instruct the instant SmartVent to wait an interval threshold amount of time 330. This interval threshold amount of time will vary depending upon the period and type currently being calibrated 320. For example, if the calibration component is measuring the effects during a morning period interval, any adjustments that were previously made 328 may be allowed to run with the system for a 10 minute threshold; however, if the interval type is a season the interval threshold may be an entire day measured once a week.

After waiting the appropriate interval threshold amount of time 330, the calibration component may then measure any atmospheric changes in all the rooms 332. In one embodiment, the calibration component employed the sensor array in each SmartVent to obtain temperature, humidity, sensor array, network, etc. values. Such updated values may be stored on the SmartVents themselves and/or the servers 334. As updated values 334 are obtained for each interval threshold amount of time, the calibration component may continually build an interval curve, e.g., measuring an overall effect for the interval by determining the change from the previous interval 336. As the changes from one interval to the next are determined 336, these determined effects and changes are updated and stored by the calibration component in a SmartVent database 338 (e.g., see 1719 of FIG. 17 and FIG. 18). The calibration component may then determine if there any more SmartVents that are known and need to be calibrated 340. The calibration component will continue to iterate until all identified SmartVents have been calibrated. If there are still more SmartVents to be calibrated 340, the calibration component will determine if it is still within a threshold period of time; for example if the threshold calibration type was a morning, and the calibration component determines it is now an evening time, the calibration had exceeded the calibration type period and an error handler 346, may reschedule an additional sampling/calibration time. If the type is still within the period of time 342, the next SmartVent calibration will occur 344 until all SmartVents have been calibrated 322, 340. Once all the SmartVents have been calibrated 340, the calibration component may determine an overall effect for all SmartVents for the period of time and update and store those effects (e.g., as a curve/accumulation of delta calibration tables) 348.

Similarly, the calibration component may determine if there are more calibration types 350. If not, the calibration component may optionally determine if obtained measurements match those of the smart thermostat (e.g., Nest, Honeywell RTH9580, Schneider Electric EER56100, etc.) and/or HVAC system; for example, if multiple SmartVents all report a constant temperature of 72° and the HVAC/thermostat reports 58°, an error handler call 346 may generate an email or notification for the user to have the HVAC unit checked. If there are more calibration types 350, the calibration component may continue to iterate through each of the next types 352, or otherwise conclude 399.

FIG. 4 shows a logic flow diagram illustrating embodiments of an adjustment component for the SmartVent. FIG. 4 is a logic flow detailing and atmospheric adjustment component which may execute on a SmartVent and/or server 488, and interact with the user 487. Once the adjustment component starts 401, a user may provide a request to set and instantiate an atmospheric adjustment 402. For example, a user may specify a desired temperature, light level, SmartVent aperture setting, humidity level, timing of such settings, etc. For a user to provide such values, the adjustment component needs to be instantiated 404. The adjustment component may be instantiated on a user device, SmartVent, server, etc. 404. Once the adjustment component is instantiated (e.g., loading a webpage, launching an app, etc.), it may generate and provide an adjustment user interface screen 406 (see FIG. 12 for examples). Such a user interface will be provided for display to the user 408, and provide a mechanism for obtaining such atmospheric selections from the user 410. Such selections may be sent as messages/values to the adjustment component, which will obtain the values 412. For example, the desired atmospheric settings may include temperature, humidity, fresh air (e.g., opening mechanized windows), natural sunlight percentage (e.g., automated blinds), artificial sunlight percentage (e.g., light adjustments), brightness, noise level, etc.), and the target for such settings may also be specified such as an area (e.g., room, floors, home, buildings, campus, etc.) 412. Once these values are obtained 412, the adjustment component may obtain the calibration table which may have been saved in a SmartVent controller database as discussed in FIG. 3, 414.

In an optional embodiment, the adjustment component may also obtain energy costs per HVAC/SmartVent unit 416. For example heating costs during summertime wintertime and air-conditioning costs may be obtained (e.g., in one embodiment, an energy cost calculator may be fed information about the SmartVent environment, location, etc. to obtain pricing values, such as <http://wvww.acdoctor.com/energy-calculator.php>). The adjustment component may optionally determine if such factor feedback 418 should be obtained. If so, the adjustment component may provide the user interface for display 420 and obtain such additional factor selection values 422 from a user; for example, the user interface may allow the user to optimize for cost, time, $CO^2$, environmental impact, etc. If such an optional factor (e.g. cost, time, etc.) embodiment is enacted, the adjustment component may determine adjustments for the SmartVents based on these additional factors 424; for example, if cost is a factor, and a user specified the desire to minimize cost, then the adjustment component may reduce the use of the HVAC system during the heaviest regional electric grid use, i.e., during times when operating HVAC systems is most expensive.

The adjustment component may then determine the proper adjustment based on atmospheric and any additional factors from the calibration tables 426. For example, a calibration having only three SmartVents may generate a calibration table where closing SmartVent one lowers the temperature of SmartVents two and three in different rooms (e.g., see FIG. 18); should a user specifies they wish to lower the temperature of the rooms where SmartVents two and three are situated, and SmartVent one may obtain an adjustment value from the calibration table of how far to set its aperture and close the SmartVent one for an appropriate amount of time to affect the desired temperature changes in the other rooms. In one embodiment, the adjustment component will determine if any provided atmospheric selections by the user are outside the range of what is known to be possible from the calibration tables 428. If such a request is outside the realm of possibility, and error handler may be instantiated 430. Otherwise the determined adjustments are sent to the appropriate SmartVents and other devices to affect atmospheric selections by user and achieve the desired settings 432, after which the adjustment component may cease 499.

Alternative Embodiments, Parts Descriptions, and Uses of SmartVent

A number of alternative example embodiment part, material and use descriptions for the SmartVent follow:

FIGS. 5-7 shows a block diagrams illustrating embodiments of for the SmartVent. The SmartVent 501 of FIG. 5 may be constructed of a rigid material such as plastic or metal and inserted into a home's existing duct opening 716 of FIG. 7. The SmartVent's air flow openings 502 of FIG. 5 will open and close by the actuator 607 of FIG. 6 moving a corresponding rear plate 615 of FIG. 6 to either obstruct or allow air flowing from the duct 716 of FIG. 7. The actuator mechanism 614 of FIG. 6 and all the components on the SmartVent's PCB 605 of FIG. 6 (e.g., see FIG. 17 SmartVent Systemization Controller for an alternative PCB embodiment) may be powered by a power source 606*b* (e.g., batteries 1444 of FIG. 14 inserted into the battery compartment 1446 of FIG. 14) as well as a rechargeable capacitor 606 of FIG. 6. This capacitor 606 of FIG. 6 may be recharged by small turbines spun by the two fans 503 of FIG. 5. These fans 503 of FIG. 5 will spin when air flows out from the duct 716 of FIG. 7 through the SmartVent openings 502 of FIG. 5. Users can wirelessly control the flow of air through the SmartVent openings 502 of FIG. 5 by a number of mechanisms already described and throughout this disclosure (e.g., including navigating to a proprietary website on an Internet enabled device such as a personal computer, smartphone, or tablet 717 of FIG. 7). The SmartVents 501 of FIG. 5 may communicate with the user's broadband router and with each other by forming a mesh network. This mesh network may be formed by the SmartVent's wireless chip 608 of FIG. 6 and the USB bridge 613 of FIG. 6, which may be plugged into the user's router. The wireless chip 608 may be connected to an antennae 674 allowing for a multitude of communication protocols and mechanisms to be employed by the SmartVent. The RAM unit 609 of FIG. 6 and CPU 610 both may work together to execute user commands and automated algorithms. The aforementioned mechanisms may be based on user inputs into their Internet enabled computing device 717 of FIG. 7 and also on data collected and relayed by the SmartVent's proximity sensor 612 of FIG. 6 and temperature sensor 611 of FIG. 6. In one embodiment, the SmartVent may employ a UV purification light filter 677; for example, such a filter may be controlled and engaged by the SmartVent when the SmartVent's particulate sensor 628 detects particulate over a threshold level.

The SmartVent may be installed in a customer's home in place of their current vent. Once installed, a new customer may create a user account on our webpage where they may complete a survey to determine the opening/closing schedule of each SmartVent. Each SmartVent may then communicate with each other and with the user's online "cloud" account. Once a SmartVent is determined to be opened or closed, the instructions from the cloud information may be communicated to a specific SmartVent. The SmartVent may receive the instructions through the wireless chip and convert that into mechanical action through the RAM unit and CPU. This may, in turn, engage the actuator to move the rear plate to the desired open/close position.

The air SmartVents may operate cohesively as part of a wireless mesh network. Each SmartVent may communicate with the other SmartVents installed throughout a location (e.g., house). This individual mesh network will be linked to the Internet where all details of the SmartVent system may be stored in cloud servers in order to track usage and provide additional benefits to the user.

The SmartVent, particularly its housing/frame, may be manufactured employing many of the same techniques used to make traditional vents. If plastic is used, the product may be injection molded and the electronic components may be attached using glue, clasps, screw/bolts, and/or other common mechanisms. If metal is used, the product may be manufactured according to the specifics of the metal used.

The SmartVents may use a louver system as opposed to a sliding plate to restrict airflow. The material used in the manufacture of the SmartVent may be metal alloys, natural products, or other materials of adequate rigidity.

In one embodiment, a SmartVent may be constructed of rigid material such as plastic or metal. A SmartVent may have openings for air to flow through and fans to charge the capacitor 606 of FIG. 6. Compartment for batteries 604 of FIG. 4. Printed circuit board (PCB) that contains the following electronic components: CPU, RIM module, proximity sensor, temperature sensor, and the wireless chip. Capacitor may store energy to power the SmartVent's actuator, and the PCB components. Actuator may open and close the SmartVent's openings. Wireless chip may communicate with the USB bridge, Internet-enabled devices, and other SmartVents. Random access memory module may aid the CPU in executing the SmartVent's instructions and all user commands. Central processor unit may execute the SmartVent's algorithms and all user commands. Temperature sensor 611 of FIG. 6 may measure the ambient temperature in the room in which the SmartVent is placed. Proximity sensor to record activity in the room in which the SmartVent is placed. USB bridge which plugs into the user's router to form a mesh network with the user's SmartVents. Detailed view of actuator mechanism used to open and close the SmartVent's openings. Rear plate that may be moved laterally by the actuator to open and close the SmartVent openings. Duct opening into which the SmartVent is placed. Internet-enabled wireless devices (laptop computer, tablet and smartphone) used to send commands to the SmartVent.

Additional Alternative Embodiments, Parts Descriptions, and Uses of SmartVent

FIG. 5-7 show block diagrams illustrating embodiments for the SmartVent.

A SmartVent and/or a vent register 501 of FIG. 5 is provided for inserting into a home's existing duct opening (e.g., see 716 of FIG. 7). The SmartVent's air flow openings 502 open and close by sliding a rear plate 615 of FIG. 6 to either obstruct or allow air passing through the SmartVent. The rear plate 615 of FIG. 6 is moved by transmitting a signal to an actuator 607 of FIG. 6 (e.g., whereby a controlling signal for the actuator may be generated by and/or read by an actuator sensor 607B as part of a sensor array 688 of on the PCB 605 of FIG. 6) integrated with the SmartVent 501 of FIG. 5.

The actuator 607 of FIG. 6 along with the circuitry controlling the movement of the rear plate 615 of FIG. 6 may be powered using a power source 606B (e.g., a battery stored in a battery compartment 604 of FIG. 6 and/or a capacitor 606 of FIG. 6 charged by some other means (e.g., fans affixed within the SmartVent that are propelled by duct/vent air flow 503 of FIG. 5). For example, these means may be a small turbine powered by air flow through the SmartVent, a wind belt, DC to DC boost conversion from an independent power source, and/or some other independent power source. The control circuitry for the SmartVent 501 of FIG. 5 may located on a printed circuit board (PCB) 605 of FIG. 6 and/or the SmartVent Controller 1701 of FIG. 17 within the SmartVent 501 of FIG. 5.

The circuitry on the SmartVent 501 of FIG. 5 may be configured for various types of communications with controllers and networked devices in order to create an opening/closing schedule for the device. The system can be manufactured of plastic or metal using conventional manufacturing processes. The SmartVent 501 of Figure shown includes a sliding plate for closing and opening the SmartVent, resulting in various programmable levels of occlusion. In place of the plate, any number of other configurations may be applied, so long as the SmartVent 501 of FIG. 5 may be opened and closed as needed.

FIG. 5 shows a rear view of an embodiment of the SmartVent having fans 503 of FIG. 5 for powering the system. The fans 503 of FIG. 5 provided are rotated by wind passing through the SmartVent, and may be implemented into the embodiments of the SmartVent 501 of FIG. 5 in order to rotate a turbine and provide power to the capacitor 606 of FIG. 6.

FIG. 6 shows example schematic of components on the rear of the SmartVent and USB bridge. The SmartVent may contain a PCB/SmartVent Controller (see FIG. 17 for additional details and embodiments for the SmartVent Controller) having a power source 606b and/or capacitor 606 to power it. The SmartVent Controller may additionally include a CPU 610 disposed in communication with RAM 609, Memory 609 (e.g., to store various SmartVent Controller components, databases (e.g., including various calibration tables, settings, etc.), instructions, etc.), wireless chip 608 connected to an antenna 674, USB bridge 613, and sensor array 688. The sensor array may include control and/or sensor components to allow for measurement and control of: temperature sensors 621, proximity sensor 622, camera sensor 623, ambient light sensor 624, barometer 625, motion detection sensor 627, particulate sensor (e.g., smoke, pollen, pollution, foreign particulate etc. counts), infrared sensor 629, $CO^2$ sensor, CO sensor 631, air speed/turbulence sensor 607b (e.g., it may take measurements of airflow through the SmartVent by measuring the speed and consistence of the SmartVent fans 503 of FIG. 5), actuator sensor 614b (e.g., controlling and measuring the aperture state of the SmartVent through the actuator), and/or the like. The components shown 605 of FIG. 6 can be used to allow the SmartVents 501 of FIG. 5 to communicate with the user's broadband router and with other compatible SmartVents 501 by forming a mesh network. This mesh network may be formed by the SmartVent's wireless chip 608 and/or the USB bridge 613, which may be disposed in communication (e.g., plugged in) to the user's router. In one embodiment, a California Easter Laboratories (CEL) ZigBee ZICM357SP2-1C module may be used as the wireless MeshConnect chip 608, it containing an EM357 Silicon ILabs radio core. The RAM unit 609 and CPU 610 both may work together to execute user commands and automated instructions, including those discussed below. Alternatively, and/or in combination, other wireless chips may be used supplying cellular, GPS, Bluetooth (and/or beacon), WiFi and/or the like capabilities (e.g., see the SmartVent Controller in FIG. 17). The aforementioned instructions may be based on user inputs into their Internet-enabled computing device 717 of FIG. 7 and also on data collected and relayed by the SmartVent's proximity sensor 612 of FIG. 6 and temperature sensor 611 of FIG. 6.

In some embodiments, the mesh network may be configured to recognize and incorporate devices other than Smart-Vents by discovering devices using specified protocols, such as ZigBee devices, and analyzing the mesh network note map or measuring time of flight of messages sent between devices.

FIG. 7 is a view of a SmartVent 501 of FIG. 5 installed in a duct aperture 716 of FIG. 7. The SmartVent is installed on an air source, such as a duct 716, and users may communicate with the installed SmartVent using wireless devices 717. In some embodiments, the SmartVent may be installed along with an ultra-violet light purification/filter or an electrostatic filter, or with sensors for monitoring various aspects of local air quality, such as pollen, dust, ozone, natural gas, carbon monoxide, or carbon dioxide levels, among other qualities.

FIG. 8 shows a block diagram illustrating embodiments of a louver vane and casing for the SmartVent. A set of such unique airfoil louver vanes 801 may be implemented in a vent louver system incorporating the casing 802 to efficiently direct the flow of air from the SmartVent 801, as well as fully open and close the SmartVent. Vent louver vanes 801 are provided with a cross-section designed to reduce noise from airflow, especially when airflow is passing through almost completely occluded louver casings 802. The vent louver casing and vane of FIG. 8 may be incorporated into a SmartVent as shown in FIGS. 14 and 15.

FIG. 9 shows a logic flow diagram illustrating embodiments of a SmartVent Calibration Component Logic Flow for the SmartVent. The logic flow shows an example adjustment mechanism for use with a SmartVent 501 of FIG. 5 and/or a set of such SmartVents as part of an HVAC system. The example is for an HVAC system installed in a residential space with multiple rooms, but may equally apply in large buildings, campuses, and single rooms. The chart illustrates a mechanism by a system hub 905 in which the system determines if an HVAC cycle (heating or cooling) is actively being performed, or if the most recent cycle is still being performed. The cycle shows a sample heating or cooling cycle in which the HVAC system is activated for some amount of time.

The hub checks to determine if an HVAC cycle has been completed 910. If not, the hub waits 915 and checks again after a period of time has passed. If the cycle has ended 910, the hub reads the temperatures of all rooms in which the HVAC system is installed by checking temperature gauges at, or associated with, any SmartVents in the system 920. The system then determines, for each room, if the room is under 930 or over 925 conditioned (if the temperature matches a target temperature, for example), and based on the resulting analysis, will increase 935 or decrease 940 the occlusion of the SmartVent in the event of a deviant room.

The system may then wait a set period of time 950 before restarting the HVAC cycle. Once the system is running again, the hub will, once again, begin checking to determine if the cycle has been completed 905, 910, in which case the hub will once again poll the individual rooms to determine if the occlusion of each vent is appropriate 920.

In one embodiment, a deviant room is determined to exist if a room is under or over conditioned. In the case of a set point of a thermostat, the system may evaluate the temperature based on the set temperature and an acceptable error factor. If individual room settings are set, a room may be ignored, or the set temperature adjusted, for a specified SmartVent.

In some embodiments, the rooms may be systematically evaluated consecutively, and only one SmartVent is modified at a time. In such an embodiment, the all rooms may be evaluated, and the most deviant room in the system is selected for modification. Once a first heating or cooling cycle is completed, the most deviant room is determined, based on some criteria, and only a SmartVent in that room is modified. Once a second heating or cooling cycle is completed, the system again selects the most deviant room to modify. In this manner, the entire HVAC system can be defined as a differential system, and the individual vents can be modified to provide the highest probability of finding a homeostatic solution.

In some embodiments, the hub may network with devices other than the SmartVent using assorted protocols. In one embodiment, the hub is a ZigBee device, and the temperature gauges associated with the SmartVents are various ZigBee devices having a temperature attribute. In other embodiments, the device is a Wi-Fi, or other network hub, and can poll various connected devices, including phones, door intrusion sensors, window intrusion sensors, home security cameras, Internet-enabled door locks, smart thermostats, discrete temperature sensors, tablets, and computers for temperature attributes, in order to generate a temperature for a room or space. In some embodiments, various devices, such as gradient balanced non-contact thermometers, may be used to generate a temperature gradient for a space. In other embodiments, a mechanism may be used to extrapolate from known data to generate a temperature gradient.

Vents in various rooms may be coordinated to ensure that certain systemic criteria are met. These criteria could be to protect the air handler, by ensuring that some percentage (such as half) of the vents in the system are open at any given time and avoiding any potential pressure buildup in the HVAC system, or by ensuring a certain amount of air flow in the system. The system may further monitor temperature at each individual SmartVent and may thereby generate a temperature profile of the home.

The temperatures for various rooms may be assigned using a computerized interface using a drag and drop functionality, or other software/hardware mechanisms, for example, based on a computer or other wireless device. Some embodiments of potential user interfaces for such a system are illustrated below.

FIG. 10 shows a logic flow diagram illustrating embodiments of a SmartVent User Setting Component Logic Flow for the SmartVent. In the flow chart provided, a user can manually adjust and set a vent occlusion level for SmartVents in an HVAC system. In setting the system, the system may first prompt a user to select a manual programming mode 1005. If so, the system may determine if an occlusion schedule has been provided for at least one room or SmartVent 1010. If the user has not set a schedule for at least one room, the system will continue to prompt a user until the system is turned off or the user sets a schedule 1015.

Once a schedule is set for a single room, the user may set additional rooms, or may activate the system. The system will then check the time regularly 1020, and adjust the occlusion of the SmartVents as appropriate 1035. If the system is not scheduled to modify occlusion in the near future, the system may activate a sleep timer 1025 until the next time 1030 requiring a changing in the occlusion of a vent.

FIG. 11 shows a logic flow diagram illustrating alternative embodiments of a SmartVent Effect Temperature Component Logic Flow for the SmartVent. This logic flow 1105 shows that a user may input mode of operation 110 and a temperature 1115 (e.g., such as the system illustrated in FIG. 10 may incorporate a control system such as that illustrated in FIG. 9, 1120) to target a specified temperature or comfort level, rather than a desired level of occlusion. In the flow chart, the system determines if it is time to read the temperature of a room 1125, such as in FIG. 9, and if so, evaluates if the temperatures are within a required threshold 1140. If they are 1145, the system leaves the occlusion levels as they are set to sleep 1130 until a wake event 1135 (unless a change is scheduled, as in the flowchart of FIG. 10).

If the temperature requires adjustment, the occlusion level may be modified 1150), and the temperature is checked again after the following system cycle (e.g., in one embodiment upon closing any vents un un-occupied rooms 1155). In some embodiments, this method may incorporate presence detection, as described below. In such an embodiment, the system may regularly poll rooms for presence, and if no human is present in a specified room, the system may raise the occlusion level for the room.

In addition to temperature, the system may evaluate comfort levels or other criteria, including humidity or other air quality indicia, and in some embodiments, the system may have mechanisms for adjusting those other air quality indicia as part of an HVAC system.

FIG. 12 shows a screenshot diagram illustrating embodiments of a room setting controller user interface for the SmartVent. The user interface shown 1205 may implement the methods illustrated in FIGS. 9-11, and it may incorporate access to the user interface displays described 1210, 1215. In the mobile interface 1205, a user may select a room of his home, and associate a SmartVent with that room. Once a room is selected, the room's vents may be set to "open" or "close." Alternatively, a room may be controlled more directly, and occlusion settings may be accessed, as shown in FIG. 12-3. A user may further access an occupancy schedule for finer control of a specified room, and to set a schedule.

The manual mode user interface 1210 for manually setting an occlusion schedule for a SmartVent shows occlusion settings for various example rooms within a home, including a master bedroom, home office, family room, and dining room. As indicated in the 1210, the system includes five occlusion settings, ranging from fully closed to fully opened, and allows for hourly changes over the course of a day. In this way, rooms that are traditionally over or under conditioned may be adjusted to a desired temperature, and rooms that aren't used regularly, such as a bedroom during the daytime or a formal dining room for most of the day, can be adjusted to account for comfort and energy efficiency.

The automatic mode user interface 1215 shows an interface allowing a user to set occupancy for various rooms in the home, and the system may then determine an appropriate temperature. The user may also modify the temperature required for occupied rooms. The scheduling in both this and the manual interface 1210 may be based on a daily, weekly, or monthly schedule.

In some embodiments, a user may manually adjust the SmartVents and the system will record the change as a setting in the user interface based on one of these scheduling schemes. For example, the system may monitor user implemented changes in the scheduling and may incorporate such changes into the system's scheduling algorithms based on, for example, weighted averaging of the users inputs. The system may also determine a user's schedule based on use of a presence detection algorithm, such as that described below.

FIGS. 14-16 show block diagrams illustrating embodiments of exploded components, assembled components, and cross-section component views for the SmartVent. FIG. 14 shows an unassembled and exploded view of the components of the SmartVent, as detailed in the table below:

| FIG. Label Number | Part Name | Example Part Description |
|---|---|---|
| 1402 | Faceplate | |
| 1404 | Airfoil Vane | Allows or restricts airflow. Shaped to reduce noise at various levels of occlusion |
| 1406 | Vane End Cap | |
| 1408 | Torque Shaft | Transmits torque from driven end of vane to the passive end |
| 1410 | Vane End Cap | |
| 1412 | battery top cover | chassis for battery, indicator light and switches |
| 1414 | Cam | Lever arm to rotate vanes |
| 1416 | Manual Override Slider | Allows manual override of vane open and closure. Also indicated vane position |
| 1418 | PCB | |
| 1420 | clutch and gear assembly | Part of clutch assembly that allows the manual override |
| 1422 | Gearhead motor | Also with exploded further reduction worm gear |
| 1424 | Cam Arm | transmits torque between all 3 vanes |
| 1426 | Encoder | Pushes a limit switch on the PCB to signal the end of motion envelope |
| 1428 | Provision button | Indicator LED to show network status. Push button to join network |
| 1430 | spring | Part of clutch assembly that allows the manual override |
| 1432 | screw | |
| 1434 | Battery spring clips | |
| 1436 | Battery holder | |
| 1438 | Battery spring clips | |
| 1440 | Screws | |
| 1442 | Body housing | Chassis |
| 1444 | Stiffening flange | Provides rigidity/magnetic fastening for faceplate |
| 1446 | AA batteries | |

FIG. 15 shows a partially assembled view of the components of the SmartVent. FIG. 16 shows a cross-sectional view of an assembled SmartVent.

Example Presence Detection Embodiments

In some example embodiments, SmartVents may perform presence detection to enhance operations. Presence detection for detecting the presence of humans, for example, may be incorporated into an HVAC system such as that described above. In one embodiment, a presence detection mechanism is implemented in a computerized system, such as a SmartVent, a hub for a SmartVent system, and/or SmartVent Controller of FIG. 17. The system first identifies a zone for the evaluation of human presence. This zone may be a room in an HVAC system, or it may be the home in which the system is implemented. The system may then identify a device to use as an analog for human presence, such as an electronic device within the zone. This electronic device may be, for example, a smartphone or a tablet, as well as some other portable user device.

The system then receives a first signal from the device. The signal may be, for example, a Wi-Fi signal or a ZigBee signal, as well as other wireless signals. The signal is then used to evaluate a first distance between a first location and the electronic device. The first location may be, for example, a SmartVent being controlled by the system. This evaluation may be an assessment of a relatively imprecise analog for distance, such as received signal strength (RSS) from a network device. Alternatively, the signal may be initially generated by the system and reflected off the electronic device, such as a backscatter based signal.

The system then receive a second signal from the device. The signal may be an equivalent signal to the first one, i.e., it may be an identical type of signal, such as a RSS signal from the network device. The second signal may then used to evaluate a second distance between the first location and the electronic device. The first distance and the second distance are then compared to determine if there is a difference between them, and if that difference is beyond the likely error of the measurement method. If RSS is used to evaluate distance, and is found to generally be imprecise, the system may need to incorporate a substantial threshold for potential error.

Using a method such as this, the system can determine whether electronic devices are being moved within the zone, and may therefore determine if users are present.

In order to evaluate an appropriate threshold level for a measurement mechanism, the system may repeat the measurement over time, and determine a mean and standard deviation for one type of measurement. The system may also compare the results with those implied by a scheduling system, such as those described above, or a standard template for expected presence in the space.

The received signal may be received from the electronic device after sending a test signal. For example, the system may "ping" the electronic device and determine how long it takes to receive a response. The system may further be able to read meta-data, such as frame information, or other information to determine an appropriate device to use (by finding a device identified in meta-data as a mobile device, for example) and for gleaning information about the device.

In some embodiments, once the system determines that a user is present, the system sends a signal to open a Smart-Vent. The system may then continue to poll the space for electronic devices, and determine when the electronic device leaves the space. The system may then close the SmartVent to improve efficiency in other zones of the system and conserve energy. For example, if no signal is received for some period of time, the human it was acting as an analog for may be determined to have left the zone.

The system described may poll a zone at regular intervals in order to determine the presence or absence of a user. The intervals for this polling are at human time scales, in matters of minutes, for example, in order to evaluate the zone for the presence of human motion.

In an alternative embodiment, a system may determine the presence of a human within a zone by evaluating the zone for the presence of electronic devices at various times, and identifying a specific electronic device (or electronic devices) that is present some of the time. Those devices may then be used to evaluate schedules for users associated with those devices. In one example, the system may have access to a local wireless network. The system may then track devices by MAC addresses or connection metadata. The system may also attempt to connect with each device individually to log user agent and other metadata.

As such, the system may connect to a home network to identify a user. Home automation suites often work through home networks, and it is often possible to poll for DHCP logs, IP addresses, MAC addresses, and sometimes user or device names of other devices on the network. When a device is seen to leave or arrive at times already associated with a known schedule, it can be deduced that this device might be a mobile device like a cell-phone or laptop that frequently represents the presence of a user. Also, when a device is used to SmartVent the HA system online, the MAC address and user agent can be captured and used to identify the device in the future. This can then serve as one of several data points that can be used in combination or alone to probabilistically determine the presence of a user. This can be further refined by checking traffic statistics for each device and establishing a distinction between an actively used and passively used device as a function of such parameters as upload frequency and volume and download frequency and volume.

Once mobile devices are identified, either based on frequently leaving the network or metadata associated with the device, the presence of such a device may be used as an analog for user presence, and may be used to evaluate user schedules. The system may then use the presence of the devices to algorithmically determine a probabilistic presence schedule for various users.

The system may alternatively use networked presence detectors, such as motion sensors or localized thermometers, on a network associated with the zone. These devices may be ZigBee devices with presence attributes. A user interface may be provided to allow a user to associate a device having a presence attribute with a specified space (similar to associating a specified SmartVent with a space). The user may then select and use a device known to be accurate in assessing presence in a specified space.

In some embodiments, the measurement of presence detection is made more precise by providing a user with a beacon that can be carried on a key chain, for example. Such a beacon may be used to control the SmartVent directly, or it may be used for a training period so that the SmartVent may create a schedule based on the user's presence during the training period.

In some embodiments, a set of SmartVents 501 of FIG. 5 may be networked to provide an HVAC diagnostic system. Each SmartVent may then include a device for evaluating a quantity for diagnostics. In one embodiment, each SmartVent contains a delivered air speed or flow sensor and a temperature gauge. In order to diagnose issues in an HVAC unit, the air speed sensor may then be combined with known vent dimensions and used to evaluate volumetric air flow compared to an expected volumetric airflow. The expected air flow may be based on other SmartVents in the system, or an earlier measurement from the SmartVent being evaluated.

The HVAC evaluation system may include a transmission unit for alerting a user of a discrepancy between actual airflow and expected airflow.

A similar evaluation may be performed in relation to temperatures recorded by the SmartVent. In some embodiments, evaluation units may be part of a standard HVAC system, such that a mean and standard deviation for each quantity is recorded, and if the quantity strays beyond a threshold, the system alerts a user. In one example, vents are fully occluded or open, but the resulting airflow differs from expected airflow.

In some embodiments, the temperature at various SmartVents are compared to a temperature set at a thermostat, and the temperature read outs are substantially different (i.e., several standard deviations from the mean readout, or some threshold amount away from the set temperature).

In alternative embodiments, Many HA products use wireless protocols like ZigBee, 6LoWPAN, Z-Wave, and others to communicate. These wireless signals are capable of detecting when objects around them interfere with signals they send and receive. Patterns, such as fast changes in interference patterns, may be used to indicate the presence of a user in a room. In implementing an evaluation process, this mechanism may be highly affected by idiosyncratic geometric and electromagnetic properties of real-world rooms, making it highly unreliable on its own. Further, non-contact thermometers are often sensitive enough to determine when a warm body passes directly in front of its line of sight, which can be effective for guaranteeing presence, but ineffective for guaranteeing absence, due to false negatives. Multiple mechanisms, such as these, may then be used in combination to probabilistically determine the presence of a user in a broad range of scenarios by confirming which interference phenomena are unique to user presence and which are unique to properties of the room, and then confirming with a secondary process. When the Home Automation system has a gateway, or accessible node (like the SmartVent) that features Wi-Fi or Bluetooth radios, it is possible to directly see the signals broadcasted by mobile devices. These signals give metadata. WiBee detection is possible. Wi-Fi signals are detectable to ZigBee devices. Although frames may be difficult to decode, ZigBee devices may be configured to detect frames (e.g., see <http://www-users.cs.umn.edu/~tianhe/Papers/WiBee-Infocom12.pdf>, herein incorporated by reference). As such, the presence of a frame may not provide information about the user agent, LMAC address and/or ID of any device and/or even guarantee that a single device is present. However, there is a unique application to presence detection in a Home Automation system. As such, frames can give Received Signal Strength (RSS) information to a ZigBee device. This can be used to determine if a user device is in motion (and/or an interference causing moving person is in motion) and also if the device is moving toward or away from the ZigBee device. Devices in motion, almost always indicate the presence of a user and since the RSS gives signal strength, a relative decision about whether the device is in the same room with, or near a SmartVent, is possible giving room-by-room presence information.

FIG. 13 shows a block diagram illustrating embodiments of a face plates for the SmartVent.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments are also described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor, special purpose computer, and/or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flowchart and/or block diagram block or blocks.

In addition, mechanisms described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

While the present embodiments have been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure. Furthermore, the foregoing describes the embodiments in terms of those foreseen by the inventor, notwithstanding that insubstantial modifications of the embodiments, not presently foreseen, may nonetheless represent equivalents thereto.

FIG. 14-16 show block diagram illustrating embodiments of an exploded components, assembled components, and cross-section component views for the SmartVent.

SmartVent Controller

FIG. 17 shows a block diagram illustrating embodiments of a SmartVent controller. In this embodiment, the SmartVent controller 1701 may serve to aggregate, process, store, search, serve, identify, instruct, generate, match, and/or facilitate interactions with a computer through HVAC and SmartVent technologies, and/or other related data.

Typically, users, which may be people and/or other systems, may engage information technology systems (e.g., computers) to facilitate information processing. In turn, computers employ processors to process information; such processors 1703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SmartVent controller 1701 may be connected to and/or communicate with entities such as, but not limited to: one or more users from user input devices 1711; peripheral devices 1712; an optional cryptographic processor device 1728; and/or a communications network 1713.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SmartVent controller 1701 may be based on computer systems that may comprise, but are not limited to, components such as: a computer systemization 1702 connected to memory 1729.

Computer Systemization

A computer systemization 1702 may comprise a clock 1730, central processing unit ("CPU(s)" and/or "processor(s)" (these terms are used interchangeable throughout the disclosure unless noted to the contrary)) 1703, a memory 1729 (e.g., a read only memory (ROM) 1706, a random access memory (RAM) 1705, etc.), and/or an interface bus 1707, and most frequently, although not necessarily, are all interconnected and/or communicating through a system bus 1704 on one or more (mother)board(s) 1702 having conductive and/or otherwise transportive circuit pathways through which instructions (e.g., binary encoded signals) may travel to effectuate communications, operations, storage, etc. The computer systemization may be connected to a power source 1786; e.g., optionally the power source may be internal. Optionally, a cryptographic processor 1726 and/or transceivers (e.g., ICs) 1774 may be connected to the system bus. In another embodiment, the cryptographic processor and/or transceivers may be connected as either internal and/or external peripheral devices 1712 via the interface bus I/O. In turn, the transceivers may be connected to antenna(s) 1775, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FIM, etc.); a Broadcom BCM4750IUB8 receiver chip (e.g., GPS); a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); an Infineon Technologies X-Gold 618-PMB9800 (e.g., providing 2G/3G HSDPA/HSUPA communications); a MediaTek MT6620 transceiver chip (e.g., providing 802.11a/b/g/n, Bluetooth 4.0 LE, FM, global positioning system (GPS) (thereby allowing SmartVent controller to determine its location); a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1729 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMID's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SmartVent controller and beyond through various interfaces. Should processing requirements dictate a greater amount speed and/or capacity, distributed processors (e.g., Distributed SmartVent), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the SmartVent may be achieved by implementing a microcontroller such as CAST's R8051XC2 microcontroller; Intel's MCS 51 (i.e., 8051 microcontroller); and/or the like. Also, to implement certain features of the SmartVent, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SmartVent component collection (distributed or otherwise) and/or features may be implemented via the microprocessor and/or via embedded components; e.g., via ASIC, coprocessor, DSP, FPGA, and/ or the like. Alternately, some implementations of the SmartVent may be implemented with embedded components that are configured and used to achieve a variety of features or signal processing.

Depending on the particular implementation, the embedded components may include software solutions, hardware solutions, and/or some combination of both hardware/software solutions. For example, SmartVent features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SmartVent features. A hierarchy of programmable interconnects allow logic blocks to be interconnected as needed by the SmartVent system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SmartVent may be developed on regular FPGAs and then migrated into a fixed version that more resembles ASIC implementations. Alternate or coordinating implementations may migrate SmartVent controller features to a final ASIC instead of or in addition to FPGAs. Depending on the implementation all of the aforementioned embedded components and microprocessors may be considered the "CPU" and/or "processor" for the SmartVent.

Power Source

The power source 1786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1786 is connected to at least one of the interconnected subsequent components of the SmartVent thereby providing an electric current to all subsequent components. In one example, the power source 1786 is connected to the system bus component 1704. In an alternative embodiment, an outside power source 1786 is provided through a connection across the I/O 1708 interface. For example, a USB and/or IEEE 1394 connection carries both data and power across the connection and is therefore a suitable source of power.

Interface Adapters

Interface bus(ses) 1707 may accept, connect, and/or communicate to a number of interface adapters, conventionally although not necessarily in the form of adapter cards, such as but not limited to: input output interfaces (I/O) 1708, storage interfaces 1709, network interfaces 1710, and/or the like. Optionally, cryptographic processor interfaces 1727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1709 may accept, communicate, and/or connect to a number of storage devices such as, but not limited to: storage devices 1714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1710 may accept, communicate, and/or connect to a communications network 1713. Through a communications network 1713, the SmartVent controller is accessible through remote clients 1733*b* (e.g., computers with web browsers) by users 1733*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., Distributed SmartVent), architectures may similarly be employed to pool, load balance, and/or otherwise decrease/increase the communicative bandwidth required by the SmartVent controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1710 may be used to engage with various communications network types 1713. For example, multiple network interfaces may be employed to allow for the communication over broadcast, multicast, and/or unicast networks.

Input Output interfaces (I/O) 1708 may accept, communicate, and/or connect to user input devices 1711, peripheral devices 1712, cryptographic processor devices 1728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; a PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HS- DPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1711 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1712 may be connected and/or communicate to I/O and/or other facilities of the like such as network interfaces, storage interfaces, directly to the interface bus, system bus, the CPU, and/or the like. Peripheral devices may be external, internal and/or part of the SmartVent controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the SmartVent controller may be embodied as an embedded, dedicated, and/or monitor-less (i.e., headless) device, wherein access would be provided over a network interface connection.

Cryptographic units such as, but not limited to, microcontrollers, processors 1726, interfaces 1727, and/or devices 1728 may be attached, and/or communicate with the SmartVent controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, 12200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1729. However, memory is a fungible technology and resource, thus, any number of memory embodiments may be employed in lieu of or in concert with one another. It is to be understood that the SmartVent controller and/or a computer systemization may employ various forms of memory 1729. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1729 will include ROM 1706, RAM 1705, and a storage device 1714. A storage device 1714 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1729 may contain a collection of program and/or database components and/or data such as, but not limited to: operating system component(s) 1715 (operating system); information server component(s) 1716 (information server); user interface component(s) 1717 (user interface); Web browser component(s) 1718 (Web browser); database(s) 1719; mail server component(s) 1721; mail client component(s) 1722; cryptographic server component(s) 1720 (cryptographic server); the SmartVent component(s) 1735; and/or the like (i.e., collectively a component collection). These components may be stored and accessed from the storage devices and/or from storage devices accessible through an interface bus. Although non-conventional program components such as those in the component collection, typically, are stored in a local storage device 1714, they may also be loaded and/or stored in memory such as: peripheral devices, RAM, remote storage facilities through a communications network, ROM, various forms of memory, and/or the like.

Operating System

The operating system component 1715 is an executable program component facilitating the operation of the SmartVent controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AI&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SmartVent controller to communicate with other entities through a communications network 1713. Various communication protocols may be used by the SmartVent controller as a subcarrier transport mechanism for interaction, such as, but not limited to: multicast, TCP/IP, UDP, unicast, and/or the like.

Information Server

An information server component 1716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SmartVent controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SmartVent database 1719, operating systems, other program components, user interfaces, Web browsers, and/or the like.

Access to the SmartVent database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SmartVent. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SmartVent as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1718 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SmartVent enabled nodes. The combined application may be nugatory on systems employing standard Web browsers.

Mail Server

A mail server component 1721 is a stored program component that is executed by a CPU 1703. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SmartVent.

Access to the StnartVent mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1722 is a stored program component that is executed by a CPU 1703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1720 is a stored program component that is executed by a CPU 1703, cryptographic processor 1726, cryptographic processor interface 1727, cryptographic processor device 1728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SmartVent may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SmartVent component to engage in secure transactions if so desired. The cryptographic component facilitates the secure accessing of resources on the SmartVent and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SmartVent Database

The SmartVent database component 1719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SmartVent database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SmartVent database is implemented as a data-structure, the use of the SmartVent database 1719 may be integrated into another component such as the SmartVent component 1735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1719 includes several tables 1719*a-e*. A user table 1719*a* includes fields such as, but not limited to: a userID, homeServerID, homeDeviceIDs, SmartVentIDs, and/or the like. The user table may support and/or track multiple entity accounts on a SmartVent. A SmartVent table 1719*b* includes fields such as, but not limited to: SmartVentIDs, homeServerID, sensorID, sensorValue, calibrationID, PAN_ID, OperatingPAN_ID, NetworkID, Address, GPS, BeaconID, BeaconLocation, userID, and/or the like. A calibration table 1719*c* includes fields such as, but not limited to: calibrationID, calibrationValues, SmartVentIDs, and/or the like. A room table 1719*d* includes fields such as, but not limited to: roomID, roomType, SmartVentIDs, and/or the like. A location table 1719*e* includes fields such as, but not limited to: locationID, locationType, roomIDs, SmartVentIDs, and/or the like. A period_type table 1719*f* includes fields such as, but not limited to: period_typeID, periodType, periodTypeIntervalThreshold, periodTypeDuration, periodValue, and/or the like.

In one embodiment, the SmartVent database may interact with other database systems. For example, employing a distributed database system, queries and data access by search SmartVent component may treat the combination of the SmartVent database, an integrated data security layer database as a single database entity.

In one embodiment, user programs may contain various user interface primitives, which may serve to update the SmartVent. Also, various accounts may require custom database tables depending upon the environments and the types of clients the SmartVent may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1719*a-f*. The SmartVent may be configured to keep track of various settings, inputs, and parameters via database controllers.

The SmartVent database may communicate to and/or with other components in a component collection, including itself, and/or facilities of the like. Most frequently, the SmartVent database communicates with the SmartVent component, other program components, and/or the like. The database may contain, retain, and provide information regarding other nodes and data.

The SmartVents

The SmartVent component 1735 is a stored program component that is executed by a CPU. In one embodiment, the SmartVent component incorporates any and/or all combinations of the aspects of the SmartVent that was discussed in the previous figures. As such, the SmartVent affects accessing, obtaining and the provision of information, services, transactions, and/or the like across various communications networks. The features and embodiments of the SmartVent discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SmartVent's features and facilities, and in many cases reduce the costs, energy consumption/requirements, and extend the life of SmartVent's underlying infrastructure; this has the added benefit of making the SmartVent more reliable. Similarly, many of the features and mechanisms are designed to be easier for users to use and access, thereby broadening the audience that may enjoy/employ and exploit the feature sets of the SmartVent; such ease of use also helps to increase the reliability of the SmartVent. In addition, the feature sets include heightened security as noted via the Cryptographic components 1720, 1726, 1728 and throughout, making access to the features and data more reliable and secure The SmartVent transforms user desired environmental setting and SmartVent measurement inputs, via SmartVent components (e.g., calibration and adjustment components), into SmartVent adjustment messages and environmental change outputs.

The StnartVent component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SmartVent server employs a cryptographic server to encrypt and decrypt communications. The SmartVent component may communicate to and/or with other components in a component collection, including itself, and/or facilities of the like. Most frequently, the SmartVent component communicates with the SmartVent database, operating systems, other program components, and/or the like. The SmartVent may contain, communicate, generate, obtain, and/or provide program component, system, user, and/or data communications, requests, and/or responses.

Distributed SmartVents

The structure and/or operation of any of the SmartVent node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SmartVent controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SmartVent controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not
bind to address');
socket_listen($sock);
$client = socket_accept($sock);
// read input data from client device in 1024 byte blocks
until end of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); //
access database server
mysql_select("CLIENT_DB.SQL"); // select database
to append
mysql_query("INSERT INTO UserTable (transmission)
VALUES ($data)"); // add data to UserTable
table in a CLIENT database
mysql_close("CLIENT_DB.SQL"); // close
connection to database
?>
```

Also, the following resources may be used to provide example embodiments regarding SOAP parser implementation:
http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm
and other parser implementations:
http://publib.boulder.ibm.com/infocenter/tivihelp/v2r1/index.jsp?topic=/com.ibm.IBMDI.doc/referenceguide259.htm
all of which are hereby expressly incorporated by reference.

FIG. 18 shows a block diagram illustrating embodiments of an n-dimensional calibration matrix table for the SmartVent. The calibration table may include a number of dimensions 1805 as has already been discussed throughout the disclosure (e.g., sensor array values 1871, period/type 1872, location 1873, SmartVent 1874, interval 1875, adjustment type 1876, environment adjustment type 1877, permutation 1878, other factors (e.g., energy cost, speed to affect desired changes, environmental impact, etc.), etc. As can be seen, measurement values may be saved for each interval of measurements 1810 and/or any other dimensional instances 1805. The SmartVent may determine delta's between such dimensional instances and/or intervals and create computed calibration tables (e.g., by calculating the difference between each such instance). These determined calibration instance tables may then be stored in an array, matrix, database, and/or other datastructures and be used to make calibration curves for different dimensional variations under which the SmartVents may be used. Later, by retrieving these calibration tables, the SmartVent may perform a lookup to determine what adjustments may be need to affect the desired outcome specified by the user. For example, if a user wishes the room in which SmartVent2 resides to be at 72 degrees, the SmartVent may look up that desired temperature value 1855 and determine that the aperture to SmartVent1 needs to be reduced from its current value of 50% 1856*a* to 40% 1856*b*.

Additional Alternative Embodiments Include

Additional embodiments and features of the SmartVent and intelligent HVAC system, include:

1) In one embodiment, a thermally self-balancing HVAC system is created, maintained and optimized over time. The thermally self-balancing HVAC system is an intelligent system, which continues to improve and learn over time. Additional data is collected and analyzed through ongoing use of the system. For example, daily habits within the house, seasonal variations, the presence or absence of individuals throughout the day and over extended periods of time are collected and analyzed. Extended absences of household inhabitants, as well as periods of greater at-home attendance (e.g. weekends), are observed, recorded and analyzed for greater HVAC system usage and efficiency.

2) In another embodiment, a self-learning vent register (SLVR) is used. Such a SLVR is an intelligent, decision-making system comprised of an electronically switchable SmartVent, sensors, and an algorithm for self-optimization. Such an SLVR can be configured within a home in a master-slave arrangement to communicate with the series of additional controllable SmartVents. This can be particularly effective to quickly establish a home network of SmartVents. In various embodiments, this home network is configured to wirelessly communicate with any of a plurality of devices, including mobile devices, a home HVAC controller, a Wi-Fi hub for connection to some cloud-based server, an existing ZigBee system, and/or the like.

3) In another embodiment, a system comprised of mesh-networked ZigBee HVAC vents to use extant ZigBee thermistors and other sensors. Many ZigBee networks have latent temperature sensing abilities distributed throughout a home. Such a system that can leverage this data and track what rooms sensors are in, as well as assist in determining the location and extended presence of home inhabitants. This can also be helpful in determining the existence of external factors, which may impact ambient conditions. For example, such a system may be configured to detect the opening and closing of external doors (including the prolonged opening of a door), the activation of a ceiling fan, the opening and closing of a window, etc. The presence of such external factors may then be analyzed to determine whether additional changes to the HVAC vents should be made. For example, in a sophisticated mesh-networked Zigbee system, a determination could be made that the door to a particular room is closed and the windows to that room are open, thereby causing the system to close all vents in that room to further conserve energy. When additional atmospheric measurements are taken in that room to reveal that the windows have in fact been closed, the vents may then be opened and the room temperature adjusted accordingly.

4) In another embodiment, an HVAC SmartVent with on board non-contact thermometer is used to measure room temperature is used. Such an onboard non-contact thermometer can be particularly effective in measuring room temperature when there is no airflow through the vents. In addition to a non-contact thermometer, the vents may also include an infrared sensor, a motion sensor, a Wi-Fi/Bluetooth detection sensor to detect the presence-absence of the mobile device, and the like.

5) In another embodiment, an HVAC SmartVent with a slider mechanism to accomplish occlusion and reduce space is used (to create room for various electronics). In other embodiments, all HVAC SmartVents are so configured so as to reduce manufacturing costs, whereby master vents include more enhanced electronic modules and slave vents would include more rudimentary electronic modules.

6) in another embodiment, the HVAC vent is configured with cogeneration of power via one or more of the following: a wind belt, turbine, DC to DC boost conversion, a thermally-regenerative module (powered by the temperature differential between the air flowing thru the vent and the ambient room temperature), etc.

In so configuring the HVAC vents, the battery power needed to remotely operate the vent is potentially fully rechargeable (or at least substantially prolonged).

7) An HVAC SmartVent with air quality diagnostic sensors and air purification functionality can use a UV lamp to purify the air.

8) In another embodiment, the present application creates a diagnostic tool for HVAC systems. Such a diagnostic tool is particularly useful for HVAC installers/contractors. Such a system could be used to diagnose problems within an existing HVAC system, and could lead to various suggested enhancements to such a system.

Given a SmartVent system that can measure the delivered air speed and temperature as well as ambient room temperature, knowing the cross sectional area of the outlet, one can determine the volumetric flow-rate of air out the vent. If one were to install an intelligent vent in every outlet of forced air ventilation network, it would be possible to map out the duct system (residential or commercial). This is a useful ability to have in the diagnosis of existing problems or making assessments regarding upgrade and or replacements. As a diagnostic tool this would help to pinpoint blocked or leaky vents and ducts. It may be useful for more accurately sizing a furnaces and heat pumps which lends to greater efficiency. Using temperature measurements at the ducts one can possibly calculate heat losses between the furnace and outlet, as well as to pinpoint the existence of uninsulated ducts (particularly in external walls). In addition, one should be able to identify over conditioned, leaky, or otherwise problematic rooms.

9) In other embodiments, a network of remotely-connected HVAC SmartVents, which provide energy savings by collecting data from: randomized test days, use data from previous years/periods of time, etc.

10) In other embodiments, an intelligent HVAC SmartVent can sense the presence of people within a room thru one or more of the following: ZigBee interference, router packet sniffing, using the non-contact thermometer, packet sniffing, read DHCP profiles and log when devices are active or when mobile devices are present, ZigBee signal strength and presence detection through Wi-Fi, non-contact thermometer presence detection, etc.

11) In other embodiments, an HVAC SmartVent is used to combine temperature and humidity measurement into a "comfort" measurement, using an Atmel or ZigBee thermistor to gradient balance the non-contact thermometer. Such unity measurements may also be communicated back to a humidifier within the HVAC system. In the absence of such a humidifier, recommendations can be made to the home user (or a monitoring system associated with the cloud-based service) to install such a humidifying system.

12) In other embodiments, a web-based survey can be created either manually or automatically for homeowners, surveying room-by-room comfort details, which creates a customized schedule of automated HVAC vent open-close schedules within a home. Customized recommendations can be made to the homeowner after an appropriate period of time for measuring ambient conditions throughout the home. These recommendations can be accepted or modified by the homeowner on a dynamic basis.

13) In another embodiment, a network of electronic HVAC SmartVent system uses a one-touch 'away' button for putting the system in an energy conservation mode without changing the thermostat settings. Such a system may monitor outside temperature conditions to assure that appropriate temperature is maintained in the home to prevent pipes from freezing, high humidity levels within the home (e.g., to prevent the build up of mold within the home), appropriate temperatures for pets and plants within the home, and the like 14) In another embodiment, a method to dynamically reduce the effective cooling/heating volume within a home HVAC system is created. By measuring airflow within various rooms, as well as the presence of various individuals throughout the home over time, the system may automatically close certain events throughout the home and/or provided suggestions to the homeowner for closing various doors and windows throughout the home at various points in the day, thereby isolating certain rooms and reducing volume within the home for cooling/heating. In particularly sophisticated embodiments of the present invention, the system uses automatic door closing elements to achieve such an automatic reduction in volume within the home.

Additional Embodiments

1. A computerized method for detecting presence within a zone comprising:
   a. identifying a device within the zone,
   b. receiving a first signal from the device,
   c. evaluating the first signal to determine a first distance from a first location to the electronic device,
   d. receiving a second signal from the device,
   e. evaluating the second signal to determine a second distance from the first location to the device, and
   f. determining if a difference between the first distance and the second distance is above a first threshold.

2. The computerized method of embodiment 1 wherein the first signal and the second signal are each responsive to transmitted test signals.

3. The computerized method of embodiment 1 wherein the first threshold is a difference attributable to error in an evaluation.

4. The computerized method of embodiment 1 further comprising sending a signal to open a vent register if the difference between the first distance and the second distance is above the first threshold.

5. The computerized method of embodiment 4 further comprising sending a signal to close the vent register if no signal is received from the device for an amount of time above a second threshold.

6. The computerized method of embodiment 1 wherein the evaluation of each of the first signal and the second signal comprises assessing the Received Signal Strength (RSS) of the corresponding signal.

7. The computerized method of embodiment 6 wherein the evaluation further comprises comparing the first signal and the second signal to a standard deviation and average of distances determined from signals received from the device over time.

8. The computerized method of embodiment 1 wherein the receiving of the first signal and the receiving of the second signal are within 10 minutes of each other.

9. A computerized method for detecting presence within a zone comprising:
   a. evaluating the zone for the presence of one or more devices at a first time,
   b. evaluating the zone for the presence of one or more devices at a second time,
   c. identifying a first device of the devices responsive to the evaluation of the location within the location at one of the first time and the second time,
   d. determining that the device was not present or was not responsive to the evaluation of the zone at the other of the first time and the second time.

10. The computerized method of embodiment 9 further comprising sending a signal to open a vent register if the first device is present at the second time and not at the first time and sending a signal to close a vent register if the first device is present at the first time and not the second time.

11. The computerized method of embodiment 10 wherein the first device is identified as a mobile device based on meta-data.

12. The computerized method of embodiment 9 further comprising evaluating the location for the presence of devices over time and recording presence data regarding the presence and absence of the first device.

13. The computerized method of embodiment 12 wherein the first device is identified as a mobile device based on an evaluation of time periods in which the first is present in the zone.

14. The computerized method of embodiment 12 further comprising evaluating the presence data to determine if the first device is actively used or passively used.

15. The computerized method of embodiment 14 further comprising determining if the presence data indicates the presence of a human at the second time.

16. The computerized method of embodiment 12 further comprising evaluating recorded presence data regarding the presence and absence of a second device.

17. The computerized method of embodiment 16 further comprising evaluating the presence data to determine if the presence of the first electronic device indicates human presence.

18. The computerized method of embodiment 17 wherein the evaluating of the presence data comprises comparing the presence data to a data template indicating human presence.

19. A vent register unit comprising:
   a. A vent register having:
      i. A plurality of air flow openings, and
      ii. At least one blocker for at least partially blocking at least one of the air flow openings,
   b. A presence detector for detecting human presence, and
   c. An actuator for moving the at least one blocker,
   d. Wherein the actuator is controlled based on signals sent from the presence detector.

20. The vent register unit of embodiment 19 wherein the at least one blocker is a plate that slides relative to the plurality of air flow openings.

21. The vent register unit of embodiment 19 wherein the at least one blocker is a plurality of louvers.

22. The vent register unit of embodiment 19 further comprising a power generator for generating power for the actuator.

23. The vent register unit of embodiment 22 wherein the power generator is a windbelt.

24. The vent register unit of embodiment 22 wherein the power generator utilizes a DC to DC boost conversion.

25. The vent register unit of embodiment 19 further comprising a delivered air speed sensor for determining evaluating the performance of the at least one blocker.

26. An HVAC diagnostic system comprising:
   a. a plurality of vent registers,
   b. a delivered air speed sensor associated with each vent register, and
   c. a processor for evaluating volumetric air flow at each vent register,
   d. wherein each vent register is located in a diagnostic zone,
   e. the processor determines a volumetric air flow at each vent register unit, and
   f. the volumetric air flow at a first vent register is compared to an expected volumetric air flow at the first vent register.

27. The HVAC diagnostic system of embodiment 26 further comprising a transmitter for transmitting information to a user, and wherein the transmitter transmits alert upon detection of a discrepancy between volumetric air flow and expected volumetric airflow based on an average airspeed and a standard deviation.

28. The HVAC diagnostic system of embodiment 27 wherein the average airspeed and the standard deviation are for each vent register and are calculated by the processor.

29. The HVAC diagnostic system of embodiment 27 wherein the average airspeed and the standard deviation are local, national, or global averages.

30. The HVAC diagnostic system of embodiment 29 wherein the average airspeed and the standard deviation are calculated by a computerized system associated with the HVAC diagnostic system.

31. An HVAC diagnostic system comprising:
   a. a plurality of vent registers,
   b. a temperature sensor associated with each of the plurality of vent registers,
   c. A processor for determining a temperature associated with each vent register based on the temperature sensors,
   d. wherein each vent register is located in a diagnostic zone, and
   e. the temperature associated with a first vent register is compared to an expected temperature associated with the first vent register.

32. The HVAC diagnostic system of embodiment 31 wherein the expected temperature is determined based on the actual temperature recorded associated with a second vent register in a different diagnostic zone by a corresponding temperature sensor.

33. The HVAC diagnostic system of embodiment 31 wherein the expected temperature is determined based on an assigned temperature for the first vent register.

34. The HVAC diagnostic system of embodiment 31 wherein the associated temperature sensor is a device external to the vent register and is associated with the vent register unit using a network.

35. The HVAC diagnostic system of embodiment 34 wherein the associated temperature sensor is a gradient balanced non-contact thermometer.

36. A apparatus of enhancing an HVAC system, comprising:
 a memory;
 a processor disposed in communication with said memory, and configured to issue a plurality of processing instructions stored in the memory, wherein the processor issues instructions to:
 instantiating a plurality of smart HVAC vents (a) throughout said HVAC system and (b) disposed in wireless communication with a remote HVAC controller;
 calibrating said plurality of smart HVAC vents by incrementing flow rates through each of said plurality of smart HVAC and measuring corresponding room temperatures to populate a SmartVent calibration database;
 receiving supplemental atmospheric data regarding at least one room within a structure within which said HVAC system is disposed;
 analyzing said supplemental atmospheric data and said calibration database to determine an optimized HVAC status condition; and
 transmitting instructions to said plurality of smart HVAC vents to adjust vent flow rates to achieve said optimized HVAC status condition.

37. The apparatus of embodiment 19, further, further comprising.
 determining additional room temperature data after said instructions have been transmitted to said plurality of smart HVAC vents; and
 updating said SmartVent calibration database with said additional room temperature data.

38. The apparatus of embodiment 19 further comprising.
 instantiating an additional smart HVAC vent in said HVAC system; and
 updating said SmartVent calibration database with data received from said additional smart HVAC vent.

39. The apparatus of embodiment 19 wherein each of said plurality of smart HVAC vents are disposed in wireless communication with one another.

40. The apparatus of embodiment 22 wherein said plurality of smart HVAC vents comprise one master smart HVAC vent, said master smart HVAC vent including a processor for implementing said calibrating, receiving, analyzing and transmitting functions.

41. A HVAC system processor-readable medium storing processor-issuable instructions to:
 instantiate a plurality of smart HVAC vents (a) throughout said HVAC system and (b) disposed in wireless communication with a remote HVAC controller;
 calibrate said plurality of smart HVAC vents by incrementing flow rates through each of said plurality of smart HVAC and measuring corresponding room temperatures to populate a SmartVent calibration database;
 receive supplemental atmospheric data regarding at least one room within a structure within which said HVAC system is disposed;
 analyze said supplemental atmospheric data and said calibration database to determine an optimized HVAC status condition; and
 transmit instructions to said plurality of smart HVAC vents to adjust vent flow rates to achieve said optimized HVAC status condition.

42. The medium of embodiment 24, further, further comprising
 determine additional room temperature data after said instructions have been transmitted to said plurality of smart HVAC vents; and
 update said SmartVent calibration database with said additional room temperature data.

43. The medium of embodiment 24 further comprising.
 instantiate an additional smart HVAC vent in said HVAC system; and
 update said SmartVent calibration database with data received from said additional smart HVAC vent.

44. The medium of embodiment 24 wherein each of said plurality of smart HVAC vents are disposed in wireless communication with one another.

45. The medium of embodiment 27 wherein said plurality of smart HVAC vents comprise one master smart HVAC vent, said master smart HVAC vent including a processor for implementing said calibrating, receiving, analyzing and transmitting functions.

46. A HVAC processor-implemented system, comprising means to:
 instantiate a plurality of smart HVAC vents (a) throughout said HVAC system and (b) disposed in wireless communication with a remote HVAC controller;
 calibrate said plurality of smart HVAC vents by incrementing flow rates through each of said plurality of smart HVAC and measuring corresponding room temperatures to populate a SmartVent calibration database;
 receive supplemental atmospheric data regarding at least one room within a structure within which said HVAC system is disposed;
 analyze said supplemental atmospheric data and said calibration database to determine an optimized HVAC status condition; and
 transmit instructions to said plurality of smart HVAC vents to adjust vent flow rates to achieve said optimized HVAC status condition.

47. The system of embodiment 29, further, further comprising.
 determine additional room temperature data after said instructions have been transmitted to said plurality of smart HVAC vents; and
 update said SmartVent calibration database with said additional room temperature data.

48. The system of embodiment 29 further comprising:
 instantiate an additional smart HVAC vent in said HVAC system; and
 update said SmartVent calibration database with data received from said additional smart HVAC vent.

49. The system of embodiment 29 wherein each of said plurality of smart HVAC vents are disposed in wireless communication with one another.

50. The system of embodiment 32 wherein said plurality of smart HVAC vents comprise one master smart HVAC vent, said master smart HVAC vent including a processor for implementing said calibrating, receiving, analyzing and transmitting functions.

In order to address various issues and advance the art, the entirety of this application for SmartVent and Atmospheric Controller Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SmartVent individual and/or enterprise user, database configuration and/or relational model, data type, data transmission and/or network framework, syntax structure, and/or the like, various embodiments of the SmartVent, may be implemented that enable a great deal of flexibility and customization. For example, aspects of the SmartVent may be adapted for residential/home applications, while yet others may be used in conjunction with enterprise/campus HVAC/environmental systems. While various embodiments and discussions of the SmartVent have included discussions of home applications, however, it is to be understood that the embodiments described herein may be readily configured and/or customized for a wide variety of other applications and/or implementations.

What is claimed is:

1. An HVAC system, comprising:
   a plurality of vents in communication with a computing device; and
   a plurality of sensor arrays associated with corresponding vents of the plurality of vents;
   said computing device comprising:
      a memory;
      processing circuitry for processing data acquired from the sensor arrays and issuing a plurality of processing instructions stored in the memory, wherein the processor issues instructions to:
         acquire data from each of said plurality of sensor arrays, said data comprising temperature and flow rate data from each of said plurality of sensor arrays;
         determine a configuration of said plurality of vents to optimize thermal conditions and energy efficiency of said HVAC system, in accordance with said data, on the assumption that no presence is detected; and
         transmit instructions to each of said plurality of vents in accordance with the determined configuration; and
   wherein said remote computing device collects and analyzes presence detection data and generates and transmits revised instructions to each of said plurality of vents on the basis of such presence detection data.

2. The system of claim 1, wherein each of said plurality of vents includes at least one of the plurality of sensor arrays, and wherein the plurality of sensor arrays each include temperature and flow sensors as well as at least one sensor selected from the group consisting of a humidity sensor, a motion sensor, an air quality sensor, and an infrared sensor.

3. The system of claim 1, wherein the plurality of sensor arrays are disposed within ducts of the HVAC system, said sensors being disposed remotely from the plurality of vents.

4. The system of claim 1 wherein said computing device is remote from the vents and is selected from the group consisting of a home server, cloud-based server, a mobile device, and a home HVAC controller.

5. The system of claim 1 wherein said calibration data is stored in calibration tables for facilitating transmission of instructions to adjust a plurality of vents in parallel.

6. The system of claim 1 wherein said processor is disposed in wireless communication with one or more ZigBee devices, and further wherein said processor analyzes atmospheric data received from said one or more ZigBee devices to determine if flow conditions in a particular room have changed due to an external condition selected from the group consisting of an open window, the engagement of a ceiling fan, the presence of a household pet, an open door, and the engagement of a room fan.

7. The system of claim 6 wherein said processor is disposed in wireless communication with one or more ZigBee devices, and further wherein said processor analyzes atmospheric data received from said one or more ZigBee devices to update said calibration tables.

8. A vent, comprising:
an interchangeable decorative face plate disposed on said vent;
a mounting structure for mounting said vent to an HVAC duct structure;
a wireless transmitter for communicating data from said vent to a computing device;
processing circuitry and a memory device disposed in communication with said wireless transmitter;
a rechargeable battery for providing power to said wireless transmitter, processor and memory;
a recharging device for providing additional power to said rechargeable battery, said recharging device comprising a structure selecting from the group consisting of: a thermal charger, an airflow charger, a solar charger, and a capacitor;
an atmospheric condition sensor array disposed in communication with said processor, said atmospheric condition sensor array including a temperature measuring sensor and a flow rate sensor; and
a flow rate adjustment vane disposed within said vent;
wherein said processing circuitry collects and said wireless transmitter transmits flow rate data and temperature data to said computing device; and
wherein said vent further receives optimization instructions from said computing device based on the flow rate data and temperature data, to change the flow rate through said vent, and to subsequently measure atmospheric conditions in proximity to said vent to determine if additional optimization instructions are required.

9. The vent of claim 8 wherein said computing device is a master vent.

10. The vent of claim 9 wherein said master vent is disposed in wireless communication with one or more ZigBee devices, and further wherein said master smart vent analyzes atmospheric data or motion presence data received from said one or more ZigBee devices to determine if additional optimization instructions are required.

11. The vent of claim 10 wherein said master vent is disposed in wireless communication with one or more ZigBee devices, and further wherein said master vent analyzes atmospheric data received from said one or more ZigBee devices to determine if flow conditions in a particular room have changed due to an external condition selected from the group consisting of an open window, the engagement of a ceiling fan, the presence of one or more individuals in a room, the presence of a household pet, an open door, and the engagement of a room fan.

12. The vent of claim 8 wherein said atmospheric condition sensor detects atmospheric conditions adjacent the vent.

13. The vent of claim 8 wherein the vent collects and transmits presence detection data, and wherein the optimization instructions are based on the presence detection data.

* * * * *